US009569237B2

(12) United States Patent
Ylitalo et al.

(10) Patent No.: US 9,569,237 B2
(45) Date of Patent: Feb. 14, 2017

(54) VIRTUAL MACHINE MANAGEMENT USING A DOWNLOADABLE SUBSCRIBER IDENTITY MODULE

(75) Inventors: Jukka Ylitalo, Espoo (FI); András Méhes, Sundbyberg (SE); Patrik Salmela, Espoo (FI); Kristian Slavov, Espoo (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 95 days.

(21) Appl. No.: 14/369,455

(22) PCT Filed: Dec. 29, 2011

(86) PCT No.: PCT/EP2011/074262
§ 371 (c)(1),
(2), (4) Date: Jun. 27, 2014

(87) PCT Pub. No.: WO2013/097901
PCT Pub. Date: Jul. 4, 2013

(65) Prior Publication Data
US 2014/0373012 A1  Dec. 18, 2014

(51) Int. Cl.
*G06F 15/173* (2006.01)
*G06F 15/16* (2006.01)
(Continued)

(52) U.S. Cl.
CPC ....... *G06F 9/45533* (2013.01); *G06F 9/45558* (2013.01); *H04W 4/003* (2013.01); *H04W 4/005* (2013.01); *G06F 2009/45595* (2013.01)

(58) Field of Classification Search
CPC ...... H04W 4/003; H04W 4/001; H04W 4/005; G06F 9/45558
(Continued)

(56) References Cited

U.S. PATENT DOCUMENTS 9,274,974 B1 * 3/2016 Chen .................. G06F 12/109
2006/0111112 A1 * 5/2006 Maveddat ............ H04W 8/02
455/439
(Continued)

OTHER PUBLICATIONS

3GPP, "3rd Generation Partnership Project; Technical Specification Group Services and System Aspects; Feasibility study on the security aspects of remote provisioning and change of subscription for Machine to Machine (M2M) equipment (Release 9)", 3GPP TR 33.812 V9.2.0, Jun. 2010, 1-88.
(Continued)

*Primary Examiner* — Hieu Hoang
(74) *Attorney, Agent, or Firm* — Murphy, Bilak & Homiller, PLLC

(57) ABSTRACT

A method is presented of establishing communications with a Virtual Machine, VM, in a virtualized computing environment using a 3GPPcommunications network. The method includes establishing a Machine-to-Machine Equipment Platform, M2MEP, which comprises a Communications Module, CM, providing an end-point of a communication channel between the 3GPP network and the VM. A virtual Machine-to-Machine Equipment is established that comprises a VM running on the M2MEP and a downloadable Subscriber Identity Module, associated with the CM. The Subscriber Identity Module includes security data and functions for enabling access via the 3GPP network. The CM utilizes data in the Subscriber Identity Module for controlling communication over the communication channel between the VM and the 3GPP network.

27 Claims, 26 Drawing Sheets

(51) Int. Cl.
*G06F 9/455* (2006.01)
*H04W 4/00* (2009.01)

(58) Field of Classification Search
USPC .................................................. 709/227, 224
See application file for complete search history.

(56) References Cited

U.S. PATENT DOCUMENTS

| | | | | |
|---|---|---|---|---|
| 2006/0146057 | A1* | 7/2006 | Blythe ................ | G06F 9/45537 345/506 |
| 2007/0169107 | A1* | 7/2007 | Huttunen ................ | H04L 29/06 717/174 |
| 2008/0082447 | A1* | 4/2008 | Jogand-Coulomb ... | G06F 21/10 705/53 |
| 2009/0319793 | A1* | 12/2009 | Zic .......................... | G06F 21/34 713/172 |
| 2010/0106967 | A1* | 4/2010 | Johansson ................ | H04L 9/12 713/158 |
| 2011/0117965 | A1* | 5/2011 | Gong .................... | H04W 48/18 455/558 |
| 2011/0141953 | A1* | 6/2011 | Wright ................ | H04L 63/123 370/310 |
| 2011/0145916 | A1* | 6/2011 | McKenzie .............. | G06F 21/83 726/19 |
| 2011/0167473 | A1 | 7/2011 | Evans et al. | |
| 2011/0314145 | A1* | 12/2011 | Raleigh ............... | H04L 41/0893 709/224 |
| 2011/0314522 | A1* | 12/2011 | Palanigounder ....... | H04B 7/155 726/4 |
| 2011/0321065 | A1* | 12/2011 | Gopalakrishnan ...... | G06F 9/545 719/328 |
| 2012/0144182 | A1* | 6/2012 | Nam ..................... | G06F 9/4401 713/2 |
| 2014/0220929 | A1* | 8/2014 | Ekberg ................ | H04L 12/1457 455/406 |
| 2014/0298003 | A1* | 10/2014 | Ali ...................... | G06F 9/45558 713/2 |

OTHER PUBLICATIONS

Intel, "PCI-SIG SR-IOV Primer", An Introduction to SR-IOV Technology. Intel LAN Access Division, 2011, 1-28.
Unknown, Author, "Open vSwitch", Production Quality, Multilayer Open Virtual Switch. 2011. Accessed Dec. 6, 2011. Available online at http://openvswitch.org/.
Unknown, Author, "OpenFlow", 2011. Accessed Dec. 6, 2011. Available online at http://archive.openflow.org/.
Unknown, Author, "OpenStack", Open source software for building private and public clouds. 2011. Accessed Dec. 6, 2011. Available online at http://www.openstack.org/.
Unknown, Author, "posedge", Smart SoC Solutions. 2011. Accessed Dec. 7, 2011. Available online at http://www.posedge.com/.
Unknown, Author, "Single Root I/O Virtualization and Sharing Specification", Revision 1.0. PCI-SIG, Sep. 11, 2007, 1-84.
Unknown, Author, "What is Xen Hypervisor?", Xen, Publication date unknown, 1-3.

* cited by examiner

VIRTUAL MACHINE MANAGEMENT USING A DOWNLOADABLE SUBSCRIBER IDENTITY MODULE

FIELD OF THE INVENTION

The invention relates to the management of virtual machines in a virtualized computing environment by enabling 3GPP communications with a virtual machine (VM) using a Downloadable Subscriber Identity Module for example a 3GPP Machine Communication Identity Module, MCIM.

BACKGROUND

A virtual machine is a software implementation of a computer that executes programs in the same way as a physical machine, and is hosted (i.e. as a guest) by physical computing equipment that may be unseen by and unknown to the user or provider of the VM software. Cloud computing is a concept that provides for the delivery of computer services including computation resources, software, data access, and storage services without requiring end-user knowledge of the physical location and configuration of the computing machines that deliver the services. The services are provided to computers and other devices over a network such as the Internet. From the user's viewpoint, the services can be considered as being provided by one or more VMs.

The National Institute of Standards and Technology (NIST) defines certain characteristics of cloud computing, including:
  Elastic;
  On-demand;
  Broad network access (i.e. you should be able to access the cloud through any technology (Cellular, fixed broadband, etc);
  Resource pooling;
  Measure service ("the cloud" should be able to measure the consumption of resources, such as disk space, CPU/cycles, etc—for making charging possible).

Note that, in accordance with these general definitions, cloud computing does not necessarily imply the use of virtual machines, or a virtualization platform. However, for the purposes of the current disclosure it should be assumed that references to a cloud or to cloud computing do imply a virtualized computing environment unless indicated otherwise.

For the purposes of this discussion, the term "user" is intended to refer to any entity (individual, company, organisation, etc.) that operates or uses equipment, such as a mobile telephone or other mobile device, or a pc, laptop or other computing device, that is enabled to access a 3G or 4G network (including machine-to-machine, M2M, devices). A "subscriber" is an entity that has entered an agreement with a mobile network operator (MNO) for the provision of services—more particularly (unless stated otherwise) a subscriber referred to below is an entity that has entered an agreement for services to be provided from a VM on the subscriber's behalf. The "owner" of a VM is the entity that provides the VM software, and which may or may not be the same as the subscriber.

Mobile telecommunications network operators at present do not have an established way to manage the provision of cloud computing resources to subscribers, and in particular how to make use of the 3G and 4G technologies and standards defined by the $3^{rd}$ Generation Partnership Project (3GPP), such as the Evolved Packet System (EPS) networks, and those that relate to the Systems Architecture Evolution (SAE) and Long-Term Evolution (LTE). These are referred to hereafter as 3GPP networks.

3GPP subscriber credentials are stored on Universal Integrated Circuit Cards (UICCs or Subscriber Identification Module, SIM, cards) and are used for identifying the subscriber whose card is in 3GPP device and for establishing and securing communication between the device and the 3GPP network. The installed infrastructure for 3GPP subscriber management and the standardized technology used for it are key resources of the 3GPP operators. Increasingly, the operators are becoming bit-pipe providers for third party services, which does not provide a business model that has a high added-value potential. Instead, the operators would prefer to be involved providing services. The installed identity management system is one thing that can be used for providing new services in the form of Identity and Access Management (IAM) and security for various services. Virtualized computing does require federated identity management, for the virtual machines (VMs), and thus presents an opportunity for the network operators.

The key resources of the operators include the customer base (i.e. the potential subscribers) and the identity management for the customers, as well as the installed infrastructure. The business is based on standardized 3GPP mechanisms for charging, Quality of Service (QoS), security, roaming, interoperability, and Service Level Agreements (SLAs) etc. However, similar kinds of standards have not been established for cloud computing technologies. This makes it difficult for operators to integrate their key resources with cloud platforms in order to benefit from the cloud-computing paradigm and enter into new business fields. In summary, the problem is how to enable operators to benefit from their existing key resources with cloud computing. This can be broken down into three key areas:
  How to utilize operators' existing EPS (e.g. 3GPP/Long Term Evolution (LTE)) infrastructures in a virtualized computing environment;
  How to seamlessly integrate virtualized services running in a data-center with an EPS (e.g. 3GPP/LTE) infrastructure;
  How to bind virtual machines running in a cloud with an EPS (e.g. 3GPP/LTE) network in a secure way.

Some further background is presented below on the concept of the MCIM, as well as features of virtualized computing platforms.

MCIM is a recent concept studied by the 3GPP (see 3GPP TR 33.812, "Feasibility study on the security aspects of remote provisioning and change of subscription for Machine-to-Machine (M2M) equipment", version 9.2.0, 2010-06-22). The solution, which is targeted at M2M communication scenarios, replaces the UICC card with a software based Universal Subscriber Identification Module (USIM) that can be downloaded into the device. The object is to provide a mechanism by which devices can download their network credentials from the device's selected home operator (SHO)—i.e. the operator with whom the owner of the device has established a Service Level Agreement (SLA). The current scope of MCIM is for use with sensor-like devices that the owner usually does not have physical access to and needs to manage remotely.

The commonly agreed operating procedure is currently:
1 The owner of the device enters a SLA with a mobile network operator, to be referred to hereafter as the Selected Home Operator (SHO), and registers his/her device.

2 The Discovery and Registration Function (DRF) handling the mobile device (i.e. providing preliminary credentials to the device) is informed of the Selected Home Operator (SHO) of the device and stores this mapping.

3 The mobile device is powered on and scans for available mobile networks to try to connect to a 3GPP Visited Network Operator (VNO)/Initial Connectivity Function (ICF). The preliminary credentials stored in the machine to Machine Equipment (M2ME) are used for connecting to the network and they point to the DRF of the current home network of the device.

4 The DRF informs the M2ME about the SHO registered to it and redirects the device to the SHO/MCIM Download and Provisioning Function (DPF) operated by the SHO.

5 Next, the mobile device connects to the SHO/DRF, and downloads the proper credentials that enable the device to start using the SHO subscription as per the service agreement between the owner of the device and the mobile network operator.

Note that the term MCIM as used hereafter is intended to refer to any software based solution for providing the subscriber identification information normally found on a UICC card, and should not be considered as necessarily limited to what is specified in 3GPP TR 33.812.

Virtualized Computing provides an abstraction of a potentially unlimited amount of networking, computing and storage resources for clients. The abstraction is achieved by virtualization of the infrastructure, platform and software in data centers. There are many solutions available for providing the virtualization platform for virtual machines, for example Xen, discussed further below. In these systems multiple virtual machines can be run on one physical machine. The abstraction of unlimited and dynamically allocated resources is called a cloud platform or just a cloud. The virtual machines are run in isolated run-time environments (in Xen terminology, domUs) while the control mechanism of the virtualization platform runs in a specific run-time environment, or management domain (called dom0).

At the infrastructure level, the virtualization is implemented by means of a Virtual Machine Manager (VMM), otherwise referred to as a hypervisor. A hypervisor employs hardware virtualization techniques that allow multiple operating systems, termed guests, to run concurrently on a host computer. Xen is a well-known and widely used example of a hypervisor. Xen systems are arranged in a conceptual layered structure, as depicted schematically in FIG. 1, with the Xen hypervisor 100 as the lowest and most privileged layer residing on the hardware 102. In the layer above this are one or more guest operating systems 104, 106, 108, which the hypervisor 100 schedules across the physical CPUs of the computer machines in the data centre. The first guest operating system 104, called in Xen terminology "domain 0" (dom0), boots automatically when the hypervisor 100 boots and receives special management privileges as well as direct access to all physical hardware. Thus, dom0 can be considered as a virtual management domain. The system administrator can log in to dom0 in order to manage the other guest operating systems 106, 108, called "domain U" (domU) in Xen terminology. (See "What is Xen Hypervisor?" http://xen.org/files/Marketing/WhatisXen.pdf, as archived on web.archive.org on 22.07.2011). Any references to these Xen terms in the description below or accompanying drawings should not be considered as being limited only to a Xen system, and should be considered as equivalent to the general definition of these terms as explained above.

A virtual switch (vSwitch) 110 is implemented in software and integrated with the hypervisor 100. Open vSwitch (OVS—see http://openvswitch.org/ as archived on web.archive.org on 02.02.2011) is an example of a popular software switch that allows network configuration between virtual machines using OpenFlow (see http://www.openflow.org/ as archived on web.archive.org on 13.05.2011). In addition, the hypervisor implements one or more virtual Network Interface Cards (vNICs) 112, 114 with each guest operating system (domU) 106, 108.

A cloud operating system (Cloud OS) manages the hypervisors, domain guests (VMs), virtual switches and other resources in the data-centres and is responsible for the orchestration of the resources in a data-centre. Typically, a Cloud OS consists of multiple server instances that manage the resources (network, storage, computing). The management domain (dom0) is a part of the Cloud OS that manages the resources on one hypervisor. OpenStack is one well-known Cloud OS (see http://www.openstack.org/ as archived on web.archive.org on 23.07.2011).

Note also that the term MNO indicates the network operator of the network to which the device is connected. This may be the SHO, or it might be another network operated by a Visited Network Operator (VNO) which then communicates with the SHO.

SUMMARY

A first aspect is a method of establishing communications with a Virtual Machine, VM, in a virtualised computing environment using a 3GPPcommunications network. The method includes establishing a Machine-to-Machine Equipment Platform, M2MEP, which comprises a Communications Module, CM, providing an end-point of a communication channel between the 3GPP network and the VM. A virtual Machine-to-Machine Equipment is established that comprises a VM running on the M2MEP and a Machine Communication Identity Module, MCIM, associated with the CM. The MCIM includes security data and functions for enabling access via the 3GPP network. The CM utilises data in the MCIM for controlling communication over the communication channel between the VM and the 3GPP network.

A second aspect is a network entity configured to establish a virtual Machine-to-Machine Equipment, vM2ME that includes a Virtual Machine, VM, running in a virtualised computing environment. Communications to/from the VM are via a 3GPP communications network. The network entity comprises a processor and memory storing programming instructions. When executed by the processor, the programming instructions establish a Machine-to-Machine Equipment Platform, M2MEP, which comprises a Communications Module, CM, providing an end-point of a communication channel for communications between the 3GPP network and the VM and for controlling communications between the VM and the 3GPP network. The programming instructions executed by the processor also establish the vM2ME that comprises a VM running on the M2MEP, and a Machine Communication Identity Module, MCIM, associated with the CM, the MCIM including security data and functions for enabling access via the 3GPP network.

A third aspect is a physical Network Interface, pNIC, comprising a Physical Function, PF, providing configuration resources. The configuration resources include Communications Module, CM, resources for providing an end-point of a communication channel for 3GPP communications and for controlling the communications between a Virtual Machine, VM, and a 3GPP network, and Machine Communication Identity Module, MCIM, resources comprising security data and functions for enabling access via the 3GPP network. The pNIC also includes one or more Virtual Functions, the or each Virtual Function comprising an MCIM and an associated CM relating to an associated VM operating in a virtualised computing environment.

Another aspect is a computer/server node in a 3GPP telecommunications network. The computer/server includes a Trusted Platform Module, TPM, having a secure bootloader and being configured to execute the TPM to perform a secure boot process of a VMM of a virtualised computing system, and to establish a Trusted Environment, TRE, that comprises the VMM together with a Communications Module, CM, providing an end-point of a communication channel for 3GPP communications and for controlling the communications between a VM and the 3GPP network, and a Machine Communication Identity Module, MCIM, associated with the CM, the MCIM including security data and functions for allowing the communications with the VM via the 3GPP network.

Another aspect is a computer program for programming a computer in a network to establish a virtual Machine-to-Machine Equipment that includes a Virtual Machine, VM, running in a virtualised computing environment. Communications to/from the VM are via a 3GPP communications network. The computer program comprising instructions to establish a Machine-to-Machine Equipment Platform, M2MEP, which comprises a Communications Module, CM, providing an end-point of a channel for communications between the 3GPP network and the VM and for controlling communications between the VM and the 3GPP network. The instructions also establish a virtual Machine-to-Machine Equipment that comprises a VM running on the M2MEP and a Machine Communication Identity Module, MCIM, associated with the CM, the MCIM including security data and functions for enabling access via the 3GPP network.

Another aspect is a computer program product comprising instructions for enabling a computer in a network to establish a virtual Machine-to-Machine Equipment, vM2ME, that includes a Virtual Machine, VM, running in a virtualised computing environment. Communications to/from the VM are via a 3GPP communications network. The computer program comprises instructions to establish a Machine-to-Machine Equipment Platform, which comprises a Communications Module, CM, providing an end-point of a channel for communications between the 3GPP network and the VM and for controlling communications between the VM and the 3GPP network. The instructions also establish a virtual Machine-to-Machine Equipment that comprises a VM running on the M2MEP and a Machine Communication Identity Module, MCIM, associated with the CM, the MCIM including security data and functions for enabling access via the 3GPP network.

Embodiments enable 3GPP identities to be assigned to and used by VMs, and provide 3GPP-based security for the VMs. A solution is provided to the problem of integrating operators' key resources and the provision of virtualized computing services. The solution allows identity and access management for VMs using the 3GPP identities. More particularly, the solution consists of utilizing the MCIM for providing 3GPP identities and credentials, which can then be used for identifying the VM and for providing security and QoS to the VM. The MCIM is downloaded for the VM and run together with the communications module (CM), which utilizes the data found in the MCIM for performing 3GPP communication towards the 3GPP network. Together MCIM and CM are analogous to a 3GPP modem for the VM.

DETAILED DESCRIPTION

This disclosure provides an overall view, as well as a number of specific examples relating to the concept of managing (identifying, providing security etc.) VMs using 3GPP Machine Communication Identity Module (MCIM). As explained above a "subscriber" is an entity that has entered an agreement with a mobile network operator (MNO) for the provision of services—more particularly (unless stated otherwise) a subscriber referred to below is an entity that has entered an agreement for services to be provided from a VM on the subscriber's behalf. In many instances the VM software will be provided by the subscriber (subscriber is the owner of the VM) while, in accordance with the agreement, the MNO provides the resources for the VM and is responsible for operation of the VM on the subscriber's behalf; in other instances the MNO may be the owner of the VM and operate it to provide services on the subscriber's behalf.

Figure 43:
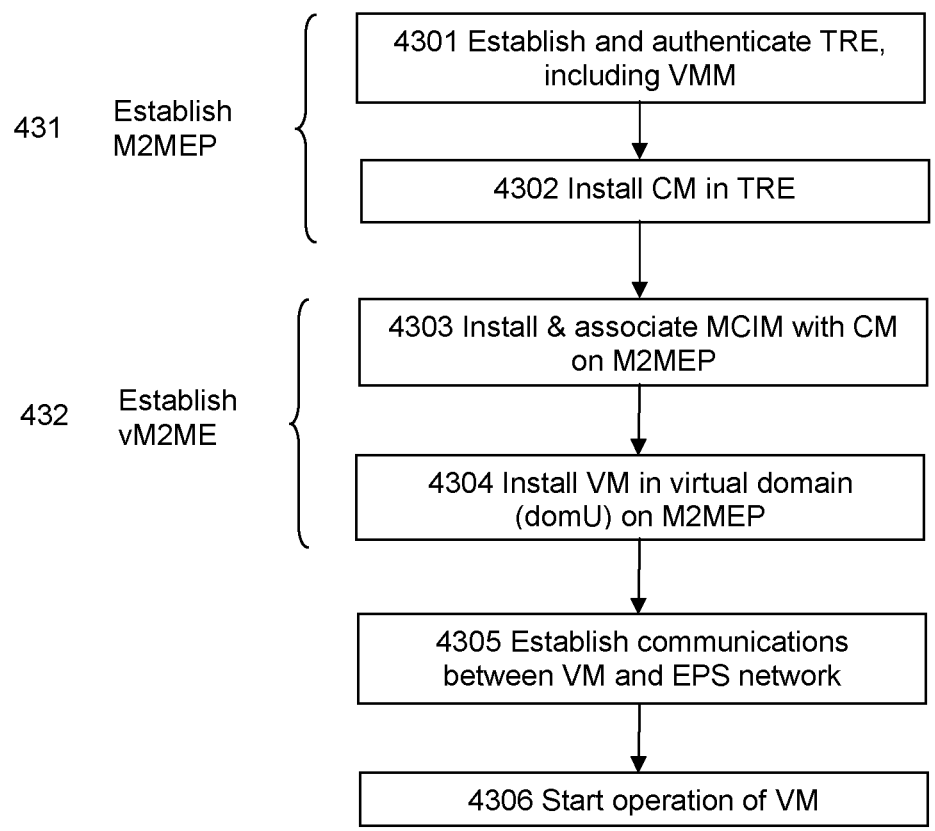
FIG. 43 is a flow chart illustrating the principal method steps involved.

FIG. 43 is a flow diagram that provides an overview of the principal method steps for the deployment of a VM in a virtualised computing environment using a 3GPP MCIM, thereby establishing communications between the VM and a 3GPP network. The method proceeds in two stages 431 and 432. Stage 431 involves establishing a Machine-to-Machine Equipment Platform, M2MEP. As shown, at step 4301 a Trusted Environment is established. In some cases this step may not require any specific action to be taken as there may already be in place an implicitly trusted environment. In other cases, establishing the TRE may involve a procedure for authenticating the TRE (for example with a Platform validation Authority, PVA). At step 4302 a Communications Module, CM, is installed in the TRE. The CM will provide an end-point for communications between the EPS network and the VM.

Stage 432 involves establishing the virtual Machine-to-Machine Equipment, vM2ME. The vM2ME will include a VM running on the M2MEP (in a virtual domain—domU) and a Machine Communication Identity Module, MCIM, associated with the CM. Thus, at step 4303 the MCIM is installed on the M2MEP. The MCIM includes security data and functions for enabling access to the VM via the EPS network. At step 4304 the VM is installed in the virtual domain (domU).

Once installed, then at step 4305 communications are established between the VM and the EPS network. The CM, being the end-point for these communications utilises data in the MCIM for controlling the communication between the VM and the EPS network. Finally at step 4306 operation of the VM is started. Thereafter the VM is able to provide services on behalf of a subscriber (identified by the MCIM data) utilising communication over the EPS network.

Four principal embodiments are described below, each describing a different deployment scenario of the MCIM and CM. In all cases, for each VM at least one MCIM is downloaded and associated with a CM. The storing, handling and running of these can vary in each of the four different embodiments. Essentially: in the first embodiment MCIM and CM are located in the management domain (dom0) (i.e. are executed by the CPUs under the control of the management domain operating system); in the second embodiment MCIM and CM are located in an operator's virtual machine that is connected to the subscriber's virtual machine; in the third embodiment MCIM and CM are located in the same virtual machine where the subscriber's service is running; and in the fourth embodiment MCIM and CM are located on a physical network interface card (pNIC).

Together the MCIM and CM form the 3GPP communication endpoint and act as a modem for the VM. The access networks and protocols used for connecting the MCIM and CM to the 3GPP network can be either a 3GPP access or a non-3GPP access, of which the latter is currently more prevalent. The non-3GPP access can be either trusted or untrusted. The communication over the access networks operates in accordance with 3GPP specifications. The MCIM and CM can also perform Network Address Translation (NAT) functionality if it is desirable that the VM maintains the same IP address when migrated. Alternatively the communication between the MCIM/CM and VM could be pure L2 communication with the IP being taken care of by the MCIM/CM.

With the embodiments discussed below, all traffic to/from the VM (e.g. with a peer in the Internet) is routed via the network of the 3GPP operator who has issued the MCIM of the subscriber. This could result in less than optimized routing if the VM is located somewhere other than in the 3GPP operator's network. In that case it is possible to utilize local breakout to provide direct access to the Internet from the VM (MCIM/CM).

The hypervisor in the virtualization environment ensures that the different resources of the VMs are isolated from each other. The isolation of MCIMs from VMs depends on how and where the MCIM and CM is run (as described in the four alternative embodiments).

The term MCIM is intended to refer to any downloadable software based solution for providing the subscriber identification information normally found on a UICC card. Each of the embodiments presented could also be achieved by using the alternative of a physical UICC instead of the MCIM located in the host hosting the VM. However, such alternatives have limitations, for example with mobility (i.e. the ability to move the subscriber's VM).

First Embodiment

MCIM and CM are Located in Virtual Management Domain (dom0)

In this embodiment, there are some definitions of terms that differ from the original ones used in 3GPP TR 33.812. These are as follows.

Virtual Machine (VM): a virtual computer running a subscriber's arbitrary operating system and software. The VM image is created by the subscriber and is therefore untrustworthy from the Mobile Network Operator's (MNO's) viewpoint.

Machine Communication Identity Module (MCIM): in 3GPP TR 33.812, MCIM is "a term that indicates the collection of M2M security data and functions for a M2ME for accessing a 3GPP network". In this embodiment MCIM resides on a Trusted Environment (TRE), or on a UICC, but otherwise all the main principles of MCIM described in 3GPP TR 33.812 still apply.

Trusted Environment (TRE): within a virtualization platform, the TRE provides a trusted run-time environment for the hypervisor and management domain (Dom0) using a Trusted Platform Module (TPM) and secure boot-loader (i.e. a sequence of actions/functions that are performed during operating system setup/boot to ensure a secure initial state). The TRE can be validated at any time by an external agency that is authorized to do so. For example, the external agency may use TPM-based remote attestation to verify the secure boot-process for the hypervisor and management domain (Dom0). The TRE provides hardware and software protection and separation for the provisioning, storage, execution and management of the VM(s). Further aspects of the TRE are discussed later.

Communications Module (CM): The communication endpoint that interacts with the MNO's 3GPP network, and sets up any necessary tunneling for the VM, such as IPsec with an Evolved Packet Data Gateway, ePDG or GPRS Tunneling Protocol, GTP. As a result, the traffic between the 3GPP network and the VM is authenticated by the MCIM.

Machine to Machine Equipment Platform (M2MEP) binds the TRE and CM together, thereby fulfilling the requirements for running Virtual Machine-to-Machine Equipment (vM2ME), which is a bundle of one or more VMs associated with an MCIM. A M2MEP is required for running vM2ME. The MCIM object and related VMs are deployed together on the M2MEP.

Subscriber: the entity that is associated with a vM2ME and has a contractual relationship with the MNO to provide the resources for the operation of the vM2ME. The MNO will, in most cases, be the operator of the data-center (M2MEP) where the vM2MEs are running, although in some cases a certified third party that is trusted by the MNO could be the operator of the data-centre.

Figure 1:
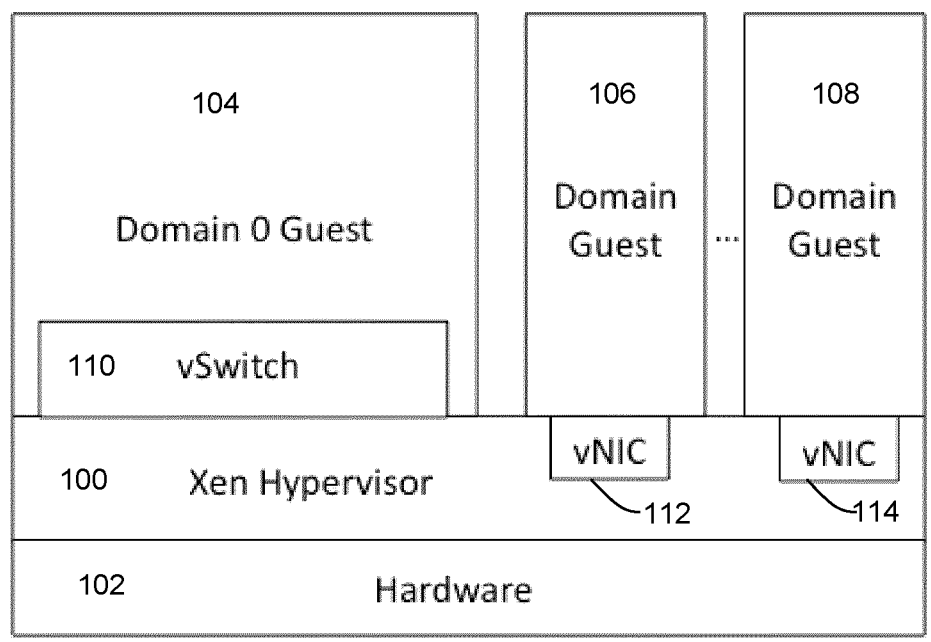
FIG. 1 is schematic illustration of a conceptual layered structure showing a hypervisor supporting various guest domains.
Figure 2:
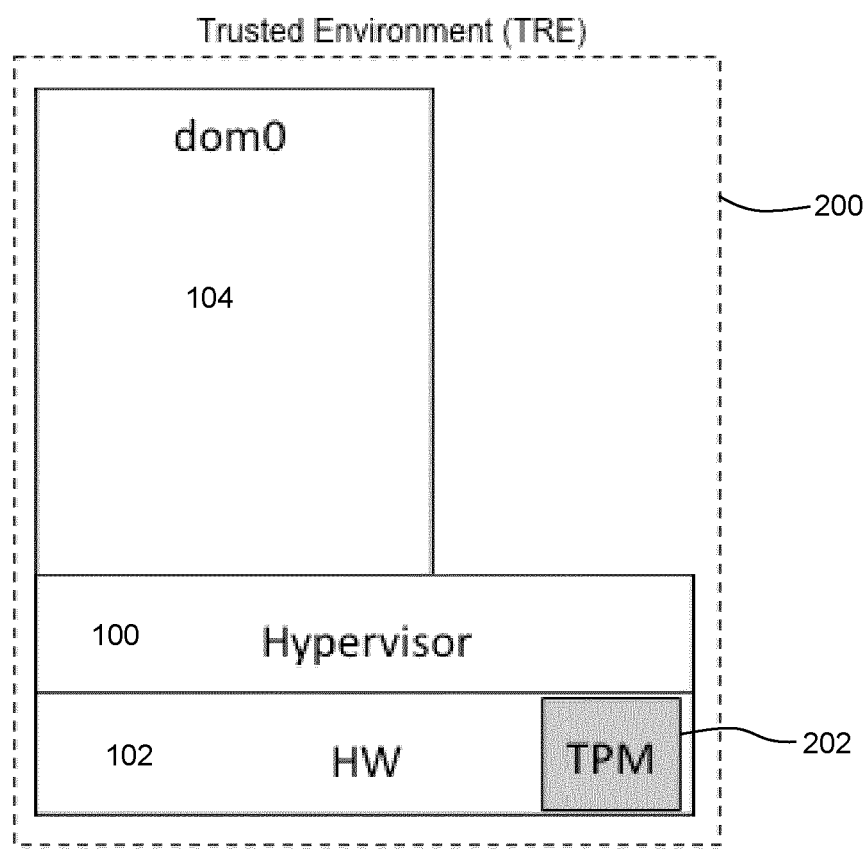
FIGS. 2-4 illustrate the conceptual stages in the building of a vM2ME, using the layered concept introduced in FIG. 1, for a first embodiment.
Figure 3:
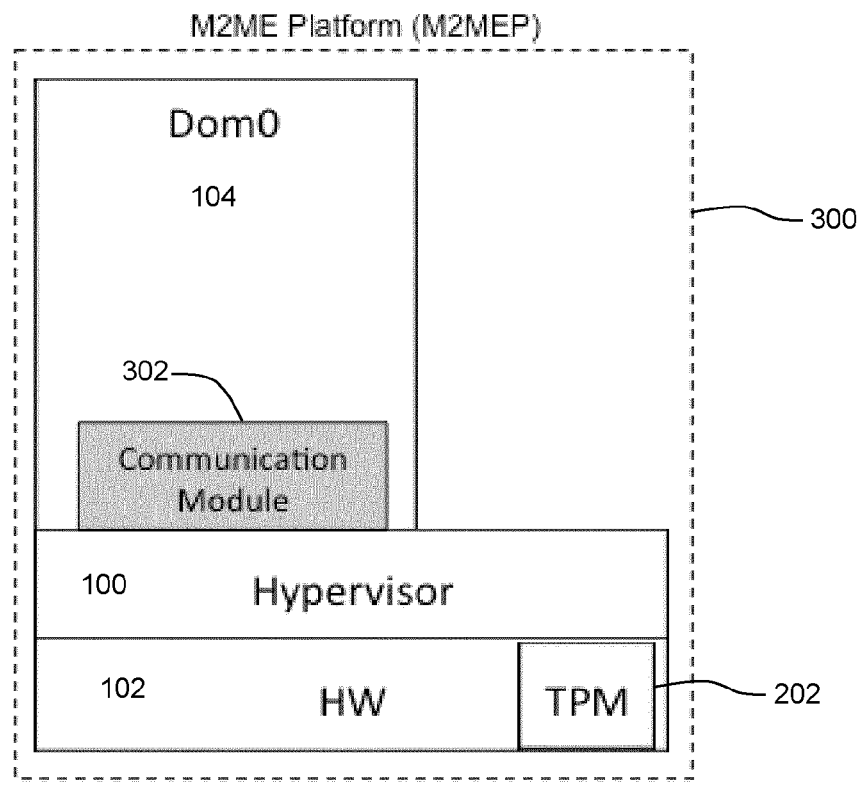
Figure 4:
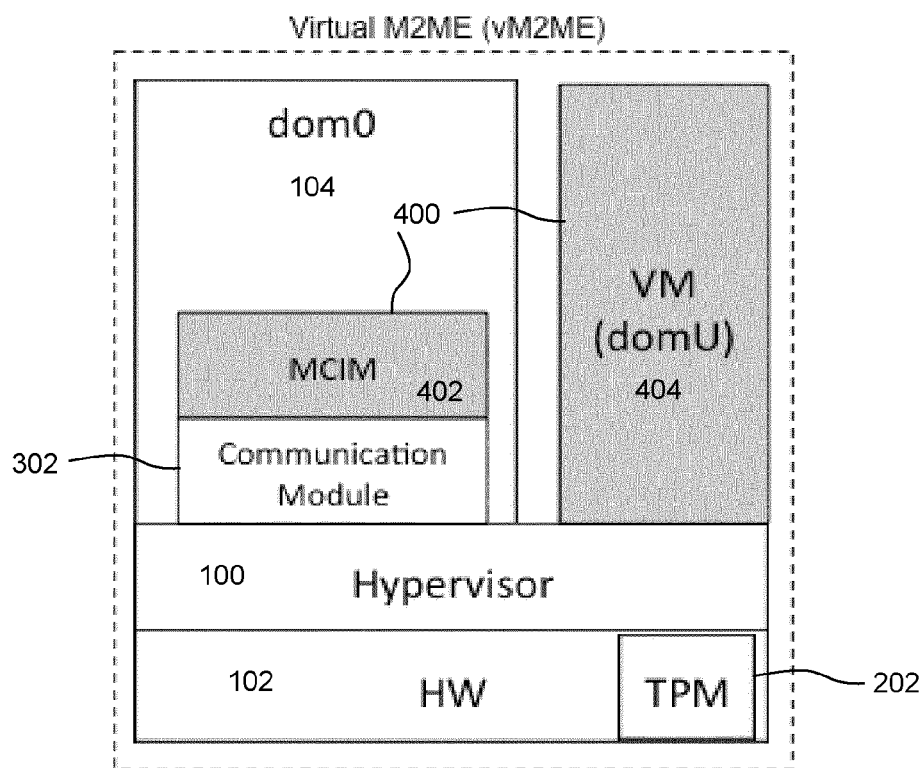

FIGS. 2-4 illustrate the conceptual stages in the building of a vM2ME, using the layered concept introduced in FIG. 1, wherein equivalent features have the same reference numerals throughout. Note that some elements shown in FIG. 1, such as the vSwitch 110 and the vNICs 112, 114 have been omitted from FIGS. 2-4 for clarity, but would actually be present. As shown in FIG. 2, a TRE 200 is defined around the dom0 104 and the hypervisor 100 residing on hardware 102, by installation of a TPM 202 together with a secure boot-loader. The TRE 200 can be validated by an external agency.

FIG. 3 illustrates the M2MEP 300, which includes all the elements of the TRE 200 of FIG. 2 together with a CM 302 installed for execution in the dom0 104.

FIG. 4 illustrates the vM2ME 400, which includes an MCIM 402 and VM 404. The vM2ME 400 is established on the M2MEP 300 shown in FIG. 3 with the MCIM 402 installed for execution with the CM 302 in the management domain (dom0) 104 and the associated VM (domU) 404.

Figure 5:
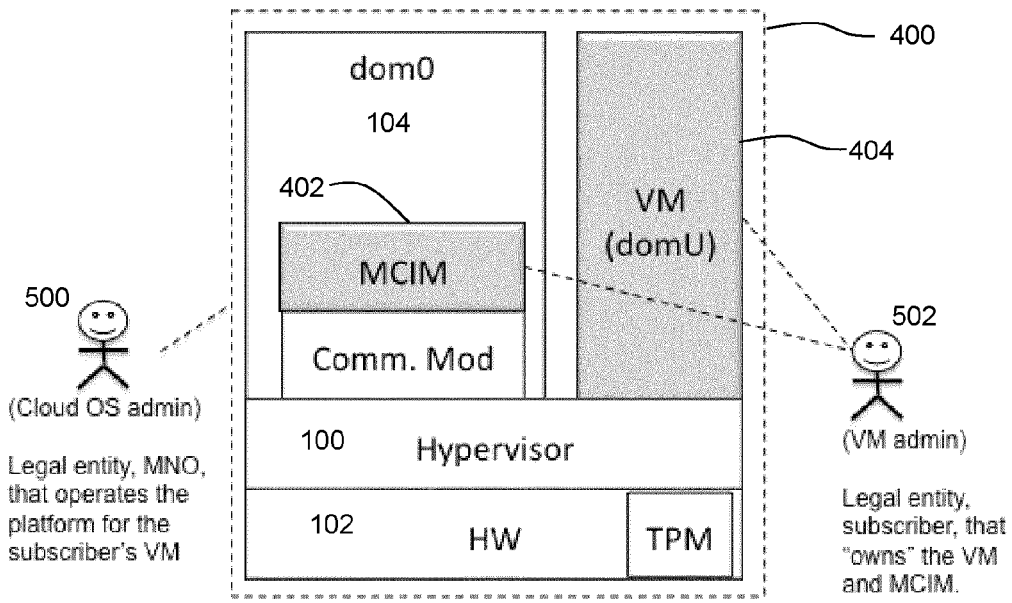
FIG. 5 illustrates schematically how the conceptual structure of the vM2ME of FIG. 4 relates to the parties involved in a service level agreement for the first embodiment.

FIG. 5 illustrates schematically how the conceptual structure of the vM2ME 400 of FIG. 4 relates to the parties involved in the service level agreement—i.e. the MNO 500 and the subscriber 502. As shown the MNO 500 operates the virtualization equipment (vM2ME 400) while the subscriber 502 is the owner of the MCIM and associated VM 404.

Note that FIGS. 2 to 5 show only one VM 404, whereas there may be more than one VM in the vM2ME owned by the subscriber 502 and associated with the MCIM 402 and CM 302. Equally the MNO 500 may provide the virtualization platform for more than one subscriber by having MCIMs and CMs installed in the management domain 104 each serving a different subscriber. In such cases, each MCIM+CM instance can have its own TRE. In other words there can be one TRE for all subscribers or one (logical) TRE for each subscriber. In the latter case, it is possible to have separate remote identifiers for each of the multiple (logical) TREs on the same management domain. Accordingly, there will be an MCIM+CM instance for each subscriber with a TRE as the trusted execution environment for MCIM+CM instances. The TRE also allows memory area isolation between MCIM+CM instances.

Figure 6:
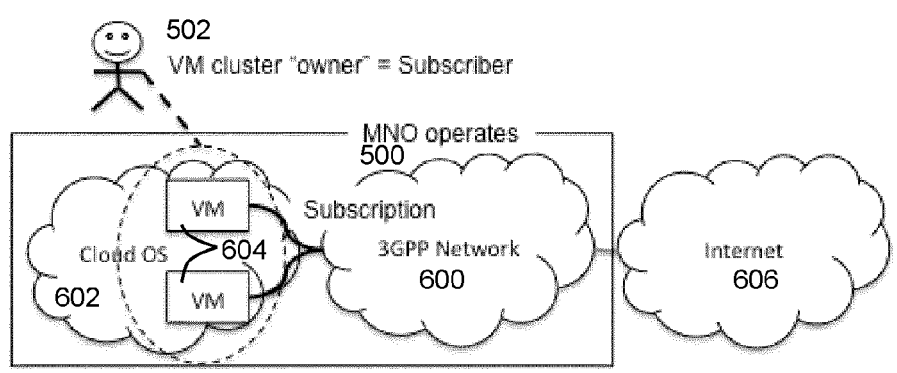
FIG. 6 illustrates schematically an exemplary use case situation for the first embodiment.

FIG. 6 illustrates schematically an exemplary situation based on this embodiment, showing that the MNO 500 is both the operator of the 3GPP network 600 and of the data center or cloud OS 602. The subscriber 502 is the owner of VMs 604 (here two VMs are shown, but there could be any number), that provide services to users (not shown) accessing the VMs 604 over the Internet 606.

Trusted environments (TREs) for Machine-to-Machine Equipment (M2ME) are discussed in 3GPP TR 33.812. In this embodiment, the MCIM is part of a vM2ME, which itself is built on a TRE. In this embodiment the TRE is implemented with the use of the TPM for performing a secure boot of the hypervisor and guest management domain (dom0), as well as for storing sensitive information such as MCIM(s). TRE verification is done, for example, using a remote attestation mechanism provided by a Platform Validation Authority (PVA). In this embodiment, the PVA verifies that the cloud OS is running the MCIM on a TRE, as discussed in 3GPP TR 33.812, which also includes a requirement for runtime environment isolation that is implemented by the hypervisor. The TPM can also be used for providing a validation of the state of the vM2ME to the PVA.

3GPP TR 33.812, in Section 5.1.3.5.8, discusses the PVA as follows:

"The PVA is the authority responsible for validating the credentials used to verify the M2M equipment as a trusted platform. The PVA may also issue these credentials. The PVA supports the following:

Validation of platform credentials that assert the authenticity and integrity of the M2ME as a platform to hold the MCIM application and credentials;

Providing the DPF and SHO with information related to the success or failure of the validation of the M2ME.

Obtaining new platform credentials when required, e.g. after a remote update of the M2ME.

Depending on TPM performance and the functionality of the MCIM, the MCIM applications, or parts of them (e.g. AKA algorithms), may be executed in the TPM, in the management domain, or in a driver in the hypervisor. Storing the critical data on the TPM is to be preferred.

Note that the TRE is trusted in a similar way to the trusting of virtual switching. The VMs (including dom0) are isolated from the other VMs and this isolation is critical for a cloud computing platform. If this failed, then the whole cloud would be compromised. The combination of TPM, hypervisor and isolated management domain together act as the trusted environment (TRE) and fulfills the same functions as a trusted M2ME as described in 3GPP TR 33.812.

Note that exposure of the hypervisor's memory to unauthorized third parties would have severe consequences for a cloud operated by a telecommunications provider (Telco Cloud). Therefore, the TRE is used to protect subscriber authentication keys in a similar way to the protection of virtual switching states etc. The cloud OS security mechanisms prevent loading of unauthorized software on the hypervisor and/or management domain (dom0).

This first embodiment describes the vM2ME concept when the MCIM resides in the management domain (Dom0) or in the hypervisor. In one approach, as described above, the MCIM and CM are executed in the management domain. In this case, the CM is associated with a virtual Network Interface Card (vNIC) and the vNIC is further associated with a VM. Typically, the associations are implemented in a vSwitch although the associations could also be expressed with certificates.

Figure 7:
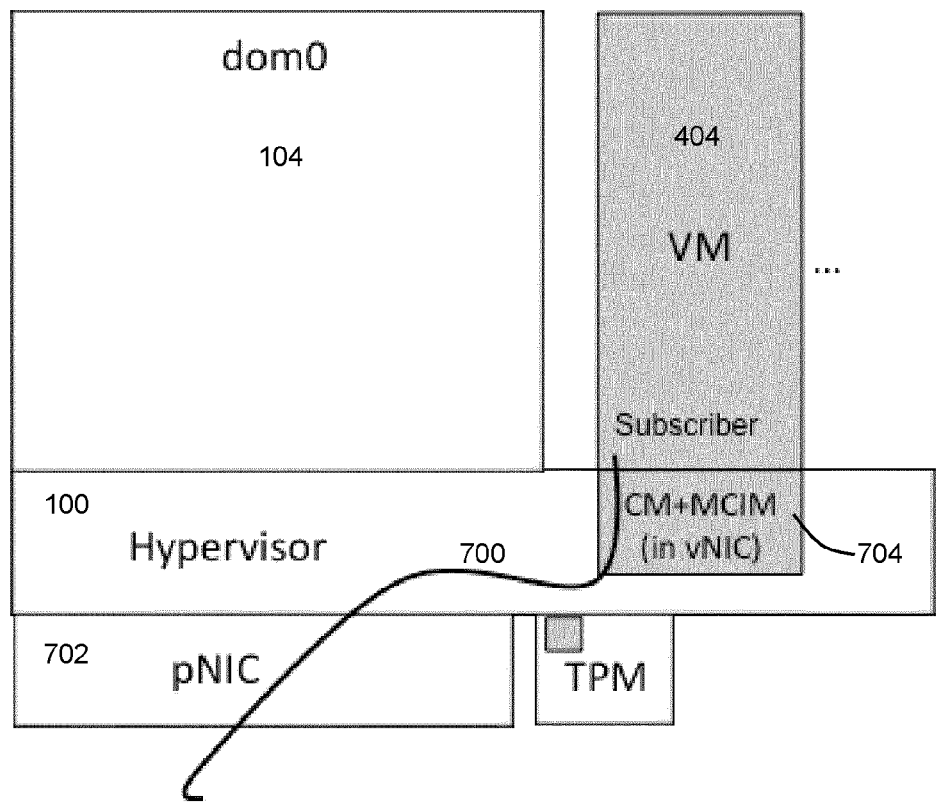
FIGS. 7-11 illustrate various alternative signal paths in the conceptual layered structure of the vM2ME for the first embodiment.

In another approach, the CM is executed inside a vNIC, as a network driver in the hypervisor. In this solution, the GTP/IPsec tunnels are terminated at the vNIC. The benefit is that the traffic does not flow all the way through the networking stack to the management domain (Dom0), but instead is routed directly to the vNIC of the destination VM. Since processing of the vNIC occurs in the hypervisor, the performance gain can be substantial. The signal path for this alternative solution is illustrated FIG. 7. In FIG. 7, as well as in FIGS. 8-11 described below, the signal path 700 from the network into the hypervisor 100 passes through a physical Network Interface Card (pNIC) 702 in the hardware (which is not shown), but the other elements are depicted in a similar conceptual layered structure as used above in FIGS. 1 to 5, with equivalent features having the same reference numerals. As shown the signal path 700 passes directly through the pNIC 702, hypervisor 100 and vNIC 704 that hosts the CM and MCIM and interfaces directly with the VM 404.

In the variations shown in FIGS. 8 to 11, the CM and MCIM are in management domain (Dom0) but they could also be executed in the hypervisor as shown in FIG. 7.

Figure 8:
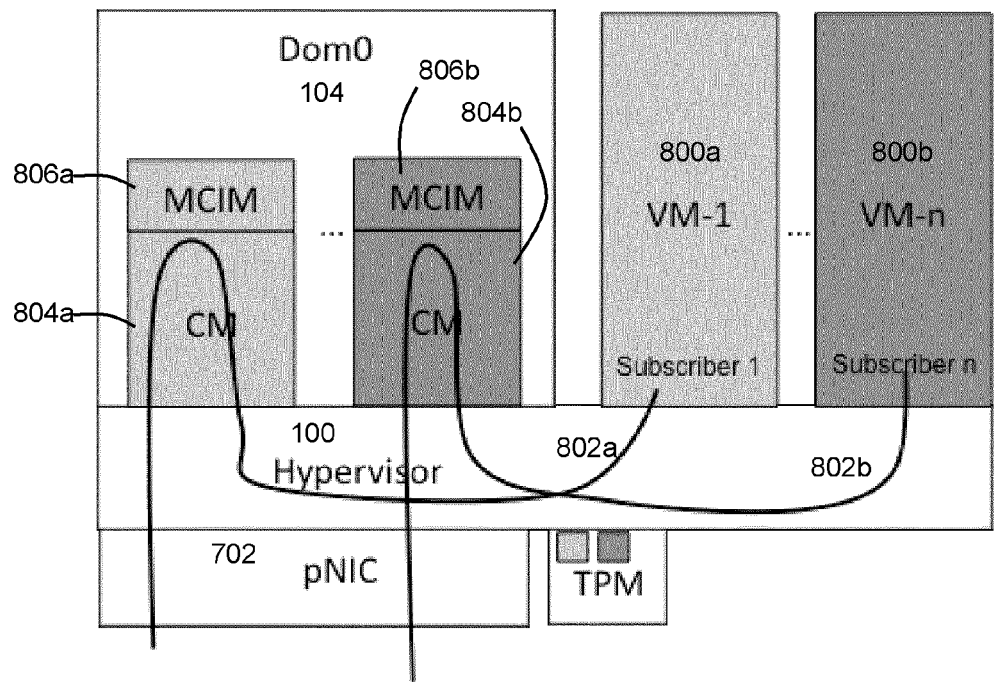

In FIG. 8, two VMs 800a, 800b, belonging to different subscribers, each have separate respective signal paths 802a, 802b and separate respective CMs 804a, 804b and associated MCIMs 806a, 806b. Thus, VM-1 800a is associated with CM 804a and MCIM 806a that form part of one TRE, and VM-n 800b is associated with CM 804b and MCIM 806b that form part of another TRE. The VM itself (domU) is not part of the TRE.

Figure 9:
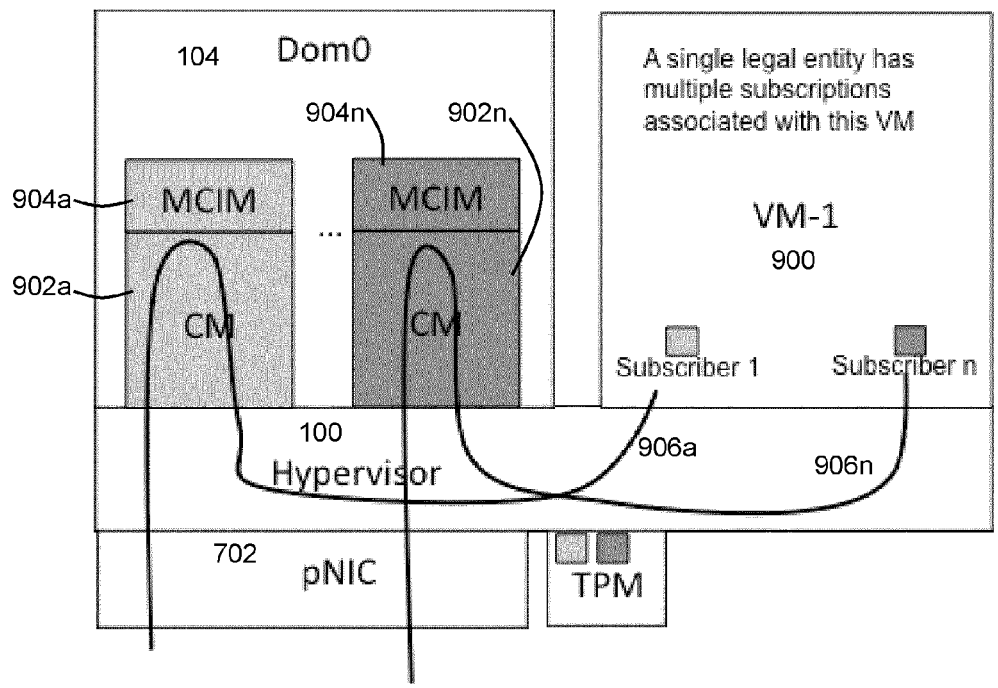

In FIG. 9, a single VM 900 is associated with a single legal entity (i.e. a single party to a service level agreement), which has multiple subscriptions (in this example two) and is associated with multiple CMs 902a, 902n and associated MCIMs 904a, 904n. Again there are two separate signal paths 906a, 906n, one for each subscription, and two separate TREs. In FIG. 9, the VM may be associated with multiple MCIMs depending on the data-center design and use-case. For example, a VM could have two virtual interfaces, one interface being bound with MCIM1 from operator-A and the other interface with MCIM2 from operator-B. Thus, a single VM may have multiple virtual network interfaces and multiple different subscriptions.

Figure 10:
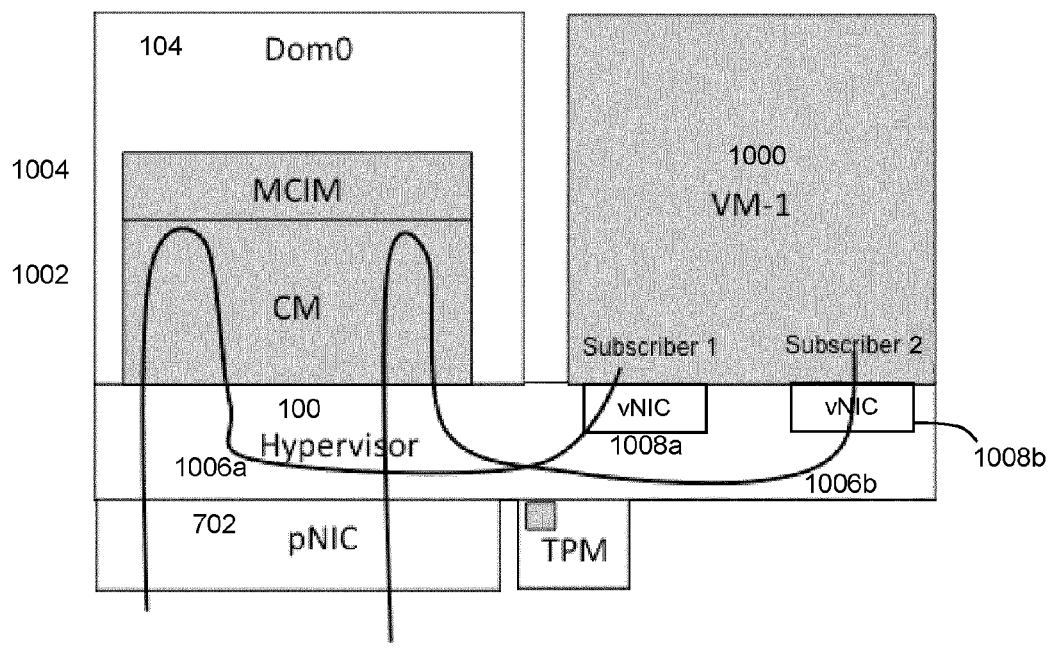

In FIG. 10 there is a single VM 1000, a single CM 1002 and associated MCIM 1004, but two different signal paths 1006a, 1006b via two separate vNICs 1008a, 1008b. In this example, a network slicing (e.g. VLAN) technique allows a single subscription to tunnel multiple traffic flows for each subscriber or VM. After the tunnel end-point in the CM, packets are associated with, and directed to, one or another of the vNICs 1008a, 1008b by means of a flow tag.

Figure 11:
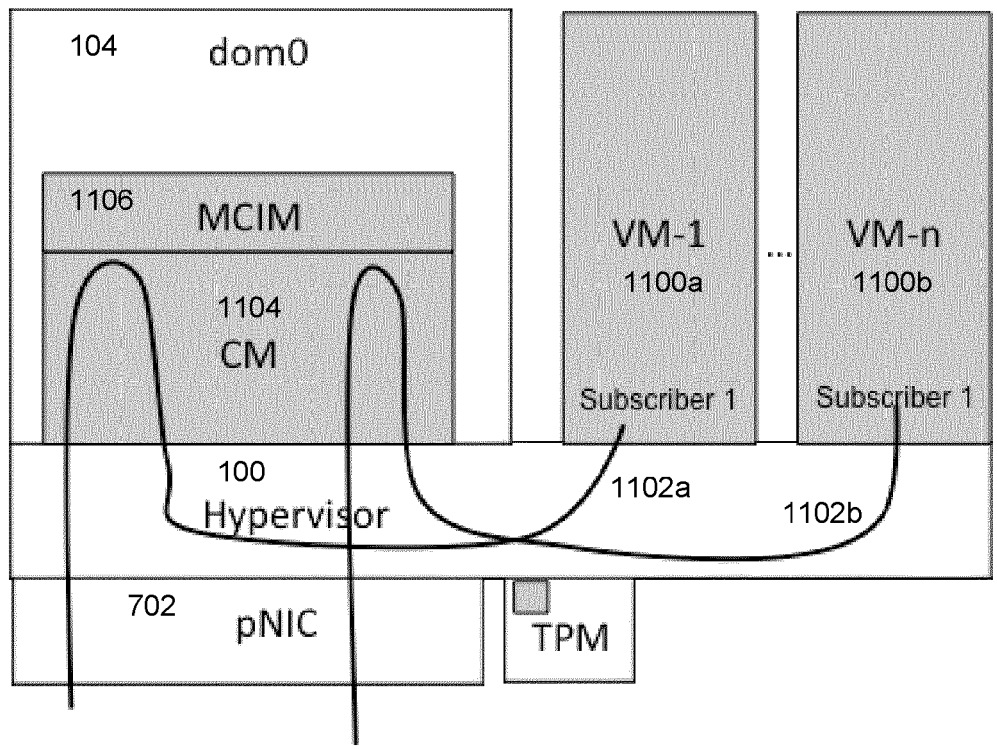

In FIG. 11 a single subscription is used for multiple (in this example two) VMs 1100a, 1100b. Thus in this case there are multiple signal paths 1102a, 1102b through a single CM 1104 and associated MCIM 1106. Also in this case there is one TRE.

Figure 12:
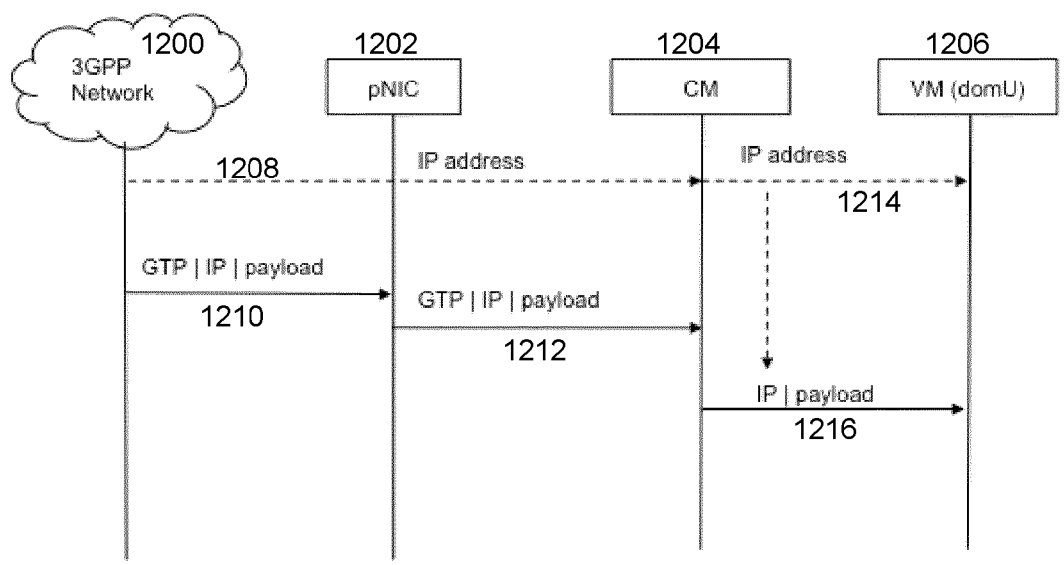
FIGS. 12 to 14 are signal flow diagrams showing the sequence of signals between the entities involved for a number of alternatives of the first embodiment.
Figure 13:
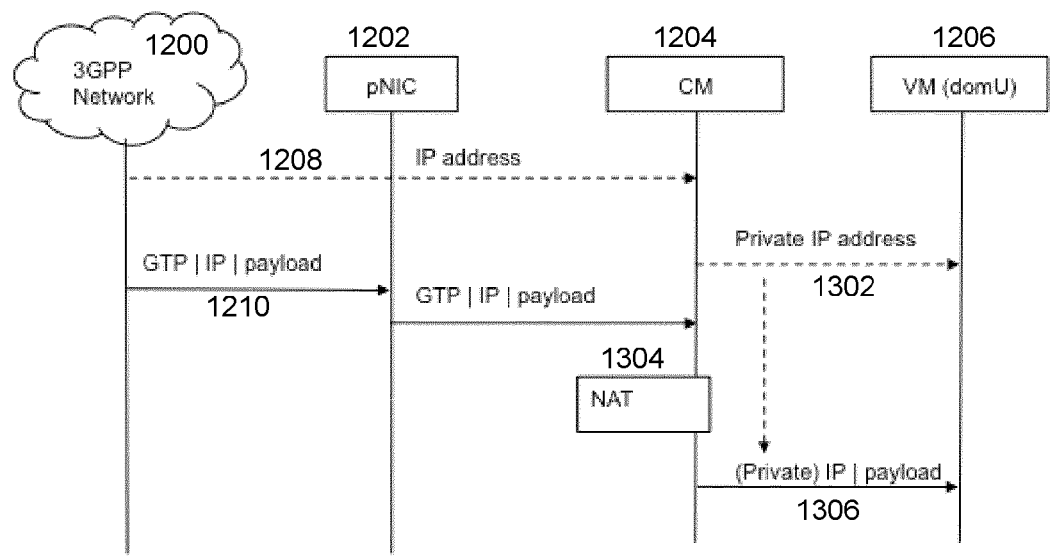
Figure 14:
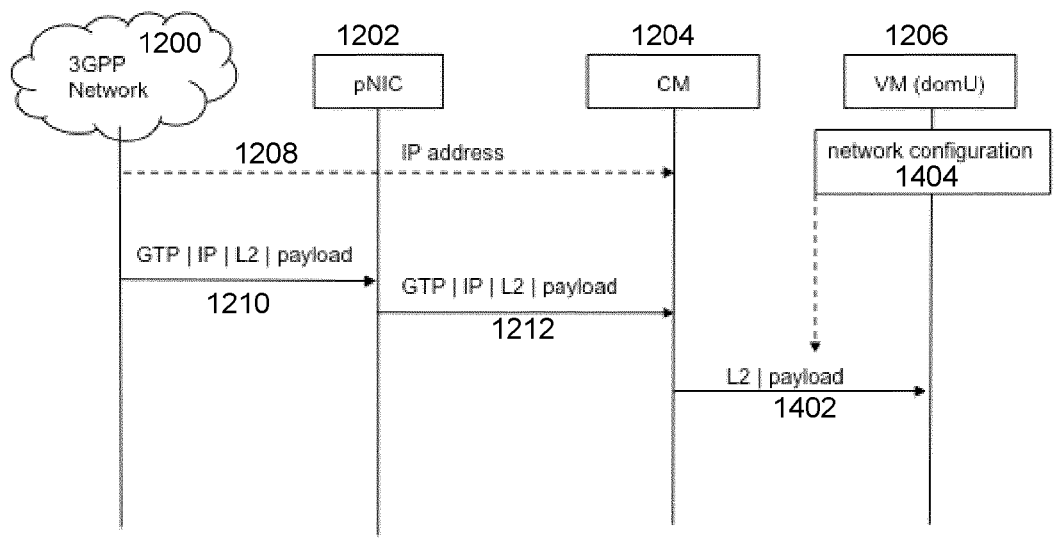

FIGS. 12 to 14 are signal flow diagrams illustrating the packet flow between the 3GPP network 1200 and VM 1206, via a pNIC 1202 and CM 1204. In all cases, the CM 1204 obtains an IP address from the 3GPP network 1200 (signal 1208) and operates as a GTP (or IPsec) tunnel end-point from the 3GPP viewpoint. As shown in these Figures, a packet comprising a GTP header, IP address and payload is sent from the 3GPP network 1200 to the pNIC 1202 in signal 1210 and on to the CM 1204 in signal 1212

FIG. 12 illustrates a first design option, in which the CM 1204 provides the same IP address that it got from the 3GPP network (e.g., with Dynamic Host Configuration Protocol, DHCP) to the VM 1206 in signal 1214. In this case the CM 1204 only adds and removes the GTP tunnel header from the packet that it forwards to the VM in signal 1216.

FIG. 13 illustrates a second design option, in which the CM 1204 operates as a Network Address Translator (NAT). In this case, the administrator of the Cloud OS (who is the MNO 500—see FIG. 5) has the freedom to select an IP address for the VM 1206. This is provided by the CM 1204 to the VM 1206 as a private address in signal 1302. As shown, at step 1304 the CM 1204 removes the GTP header from the packet and performs a NAT function to replace the IP address in the packet with the private IP address of the VM 1206, and the packet is forwarded to the VM in signal 1306 using this new address.

FIG. 14 illustrates a third design option, in which the CM 1204 operates as a normal GTP tunnel end-point and forwards the raw packet (with L2 data—i.e. layer 2 data as defined in the Open Systems Interconnection (OSI) model including, e.g. Ethernet frames) and payload) to the VM 1206 in signal 1402. As shown at 1404, the VM 1206 (or domain administrator) that is responsible for VM network configuration configures the L2 identifiers. This solution works well in data-center internal communications, but is not suitable for data-center external traffic (e.g. direct Internet connection) where either the first or second options above should be used.

Figure 15:
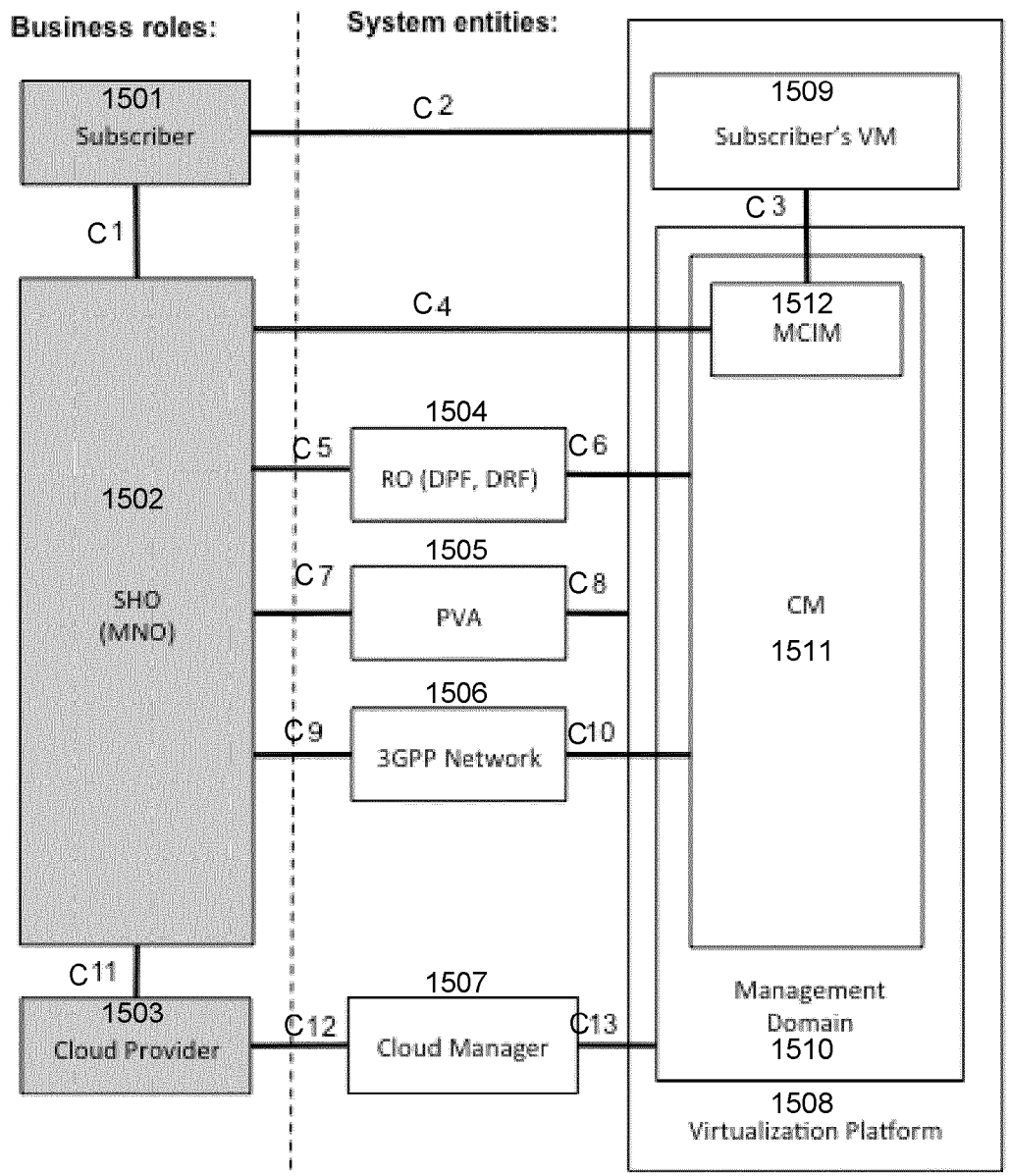
FIG. 15 is a block diagram illustrating the arrangement and communication paths between the entities for the first embodiment

FIG. 15 is a block diagram showing how the various entities described in this first embodiment are connected or inter-related. On the left-hand side are shown the business roles or parties involved, including the subscriber 1501 who wishes to become the owner of a VM, the Selected Home Operator (SHO) 1502, who in this embodiment is also the Mobile Network Operator (MNO) of the 3GPP network, and the Cloud Provider 1503. On the right-hand side are shown the system entities. These include: a Registration Operator (RO) 1504 that takes care of the registration and provisioning functions, including the Discovery and Registration Function (DRF) and Download and Provisioning Function (DPF); a Platform Validation Authority (PVA) 1505 that provides the attestation services for the TRE; a 3GPP network 1506; a cloud manager 1507; and a virtualization platform 1508. The virtualization platform 1508 includes the subscriber's VM (or VMs—i.e. the vM2ME) 1509 and the management domain (hypervisor and Dom0) 1510, within which are installed the CM 1511 and associated MCIM 1512.

The connections numbered C1 to C13 are as follows:
C1 Subscription
C2 Ownership
C3 Subscriber-VM's network, configured according to MCIM information.
C4 SHO provisioning of MCIM
C5 MCIM provisioning interface between SHO and RO
C6 MCIM provisioning interface between RO and CM
C7 Remote attestation interface between SHO and PVA C8 Remote attestation interface between PVA and CM
C9 Communication network interface
C10 Communication network interface
C11 SHO-Cloud Provider interface (if applicable—i.e. sub-contracted—otherwise integrated within SHO
C12 Cloud control interface between cloud provider (or SHO) and cloud manager
C13 Cloud control Interface between cloud manager and virtualisation platform.

In this first embodiment, the subscriber's MCIM is integrated with a 3GPP communication module running in a management domain (dom0) of a virtualization (cloud) platform. As a result, the subscriber's VM can be connected to a 3GPP network. On the cloud OS side, only a relatively small CM software module is required for handling the 3GPP specific signaling as well as the MCIM itself.

Second Embodiment

MCIM and CM are Located in an Operator's Virtual Machine that is Connected to the Subscriber's Virtual Machine In this embodiment, the definitions of terms are mainly the same as those used in the first embodiment and/or the original ones used in 3GPP TR 33.812, except as follows.

MCIM: in this embodiment the MCIM resides on a VM that is owned by the MNO and resides on a virtualization platform that is operated by a third party provider or "public cloud provider". (Alternatively the MCIM could reside on an UICC if the public cloud provider supports such feature). All the main MCIM high-level principles discussed in 3GPP TR 33.812 also apply to this embodiment.

MNO's VM: it is assumed that the MNO has bought resources from a third party (e.g. public cloud provider) on which to run the MNO's VM image (in domU). Together the TRE and CM provide the M2MEP.

Subscriber-VM: this VM is connected via virtual NICs to the CM in the MNO's VM. The MNO both requests resources for this VM and deploys the VM on behalf of the subscriber together with the subscriber's MCIM. The Subscriber-VM image is originally created by the subscriber and is (typically) untrustworthy from the MNO's viewpoint.

Trusted Environment: the TRE is built upon the virtualization platform that supports VM isolation and secure storage mechanism for the VM images. The TRE is provided by the virtualization platform according to the public cloud provider's SLA. The virtualization platform provides hardware and software protection and separation for the provisioning, storage, execution and management of the VM, optionally using a TPM and secure boot-loader. The TRE can be validated at any time by an external authority, such as a PVA, which may communicate with the cloud OS of the third party cloud provider or directly with the MNO's VM to verify the TRE. However, it is assumed here that public cloud platforms do not always support a TPM or secure boot process for the hypervisor and VMs. This is a different assumption compared to the first embodiment described above, but may be important for operators and may result in new or different security assumptions for MCIMs in a cloud environment. Thus, in this embodiment, the TRE is implemented in the form of the hypervisor and network isolation. The public cloud platform provides a secure storage mechanism for the MNO's VM images and configuration files. Sensitive information such as MCIM(s) are stored in the MNO's VM run-time environment (if there is no TPM).

Communications Module (CM): the 3GPP communication end-point is executed in the MNO's VM.

vM2ME: is a bundle of one or more Subscriber-VMs associated with an MCIM.

Subscriber: in addition, in this embodiment, the SHO can be the provider of the M2MEP, or the SHO may have a contract with another MNO to provide the M2MEP where the vM2ME is running.

Figure 16:
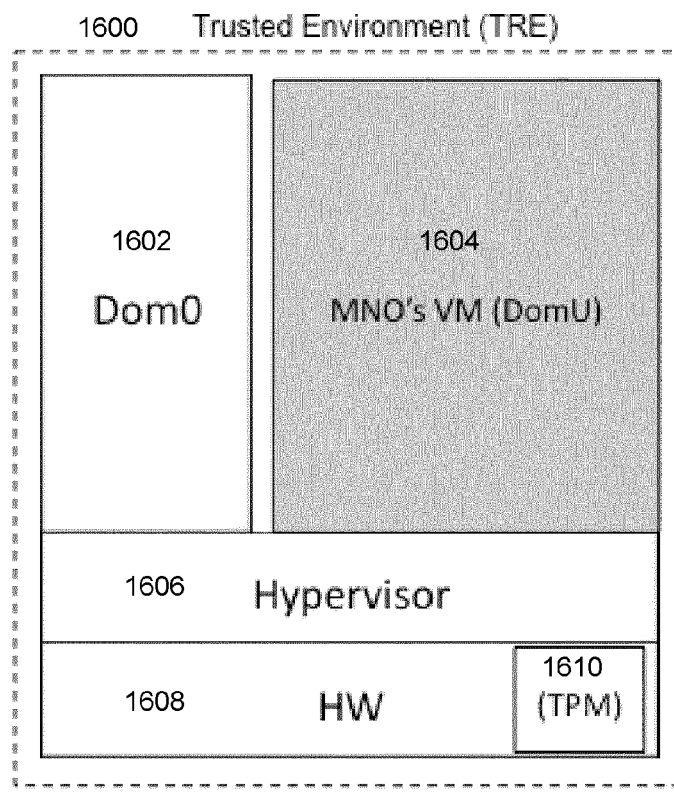
FIGS. 16-18 illustrate the conceptual stages in the building of a vM2ME, using the layered concept introduced in FIG. 1, for a second embodiment.
Figure 17:
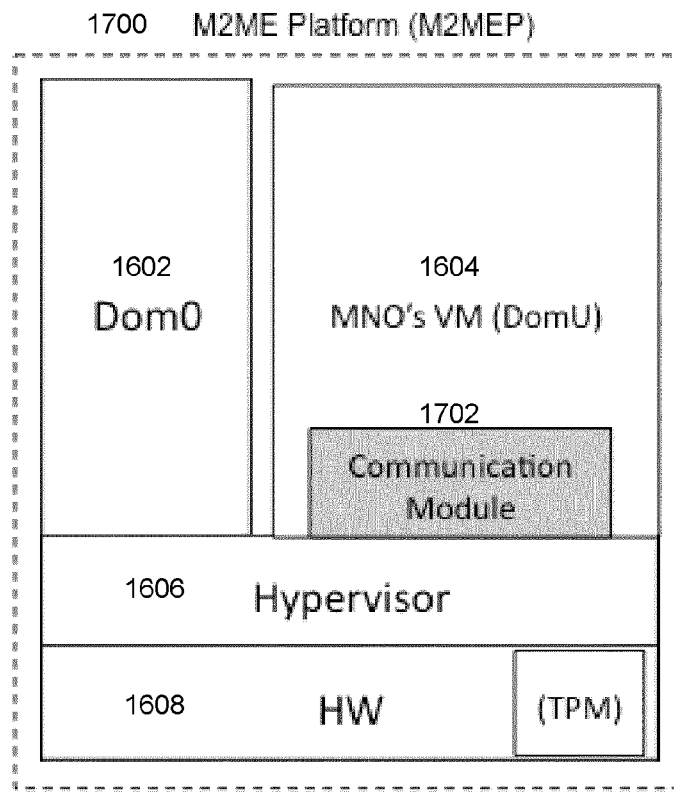
Figure 18:
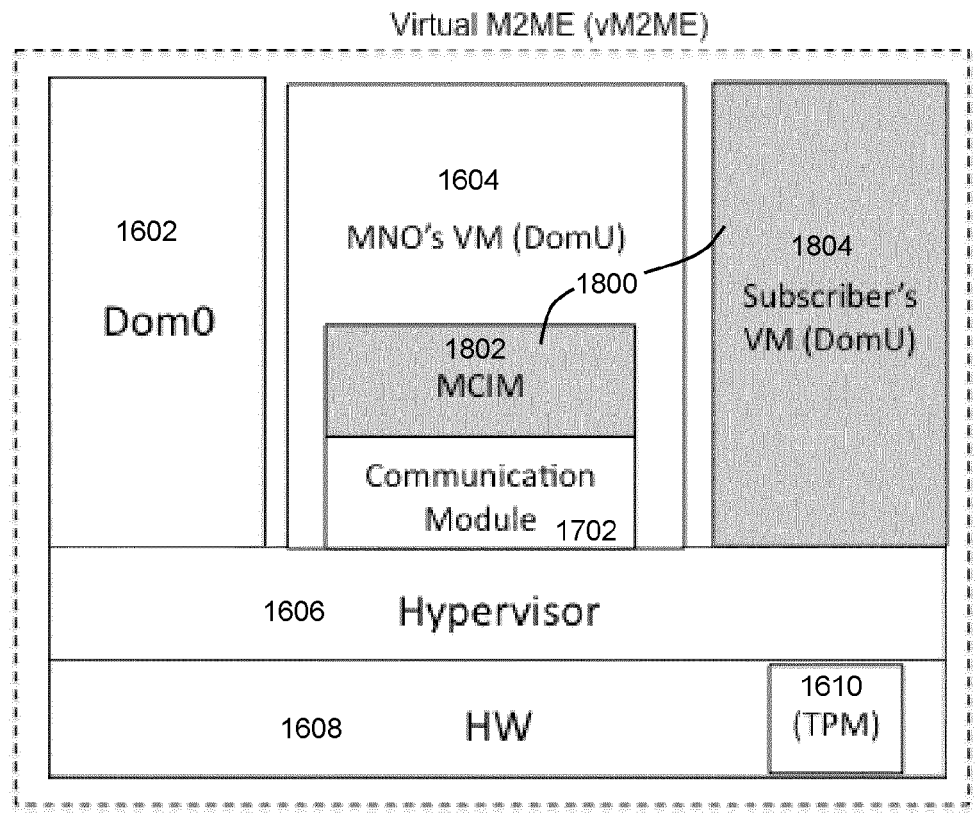

FIGS. 16 to 18 illustrate the conceptual stages in the building of a vM2ME, using the layered concept similar to FIGS. 2-4 for the first embodiment. As shown in FIG. 16, a TRE 1600 is defined around the dom0 1602, the MNO's VM 1604 in domU and the hypervisor 1606 residing on hardware 1608. However, in this case the TRE 1600 is provided by the hypervisor isolation mechanism. A TPM 1610 and secure boot-loader are optional, and may not always be available in a public cloud environment. The TRE 1600 may be implemented with different kinds of trust mechanism, for example a SLA between the cloud provider and MNO. The TRE 1600 is validated by an external authority.

FIG. 17 illustrates the M2MEP 1700, which includes all the elements of the TRE 1600 of FIG. 16 together with a CM 1702 installed for execution in the MNO's VM 1604 in domU. The CM 1702 running in the MNO's VM 1604 allows a public cloud operator to provide a M2MEP that is now able to host vM2MEs.

FIG. 18 illustrates the vM2ME 1800, which includes an MCIM 1802 and VM 1804. The vM2ME 1800 is established on the M2MEP 1700 with the MCIM 1802 installed for execution with the CM 1702 in the MNO's VM 1604 and the associated Subscriber-VM 1804 in another virtual domain (domU). The vM2ME 1800 runs the subscriber's (untrustworthy) VM 1804 on the vM2MEP.

Figure 19:
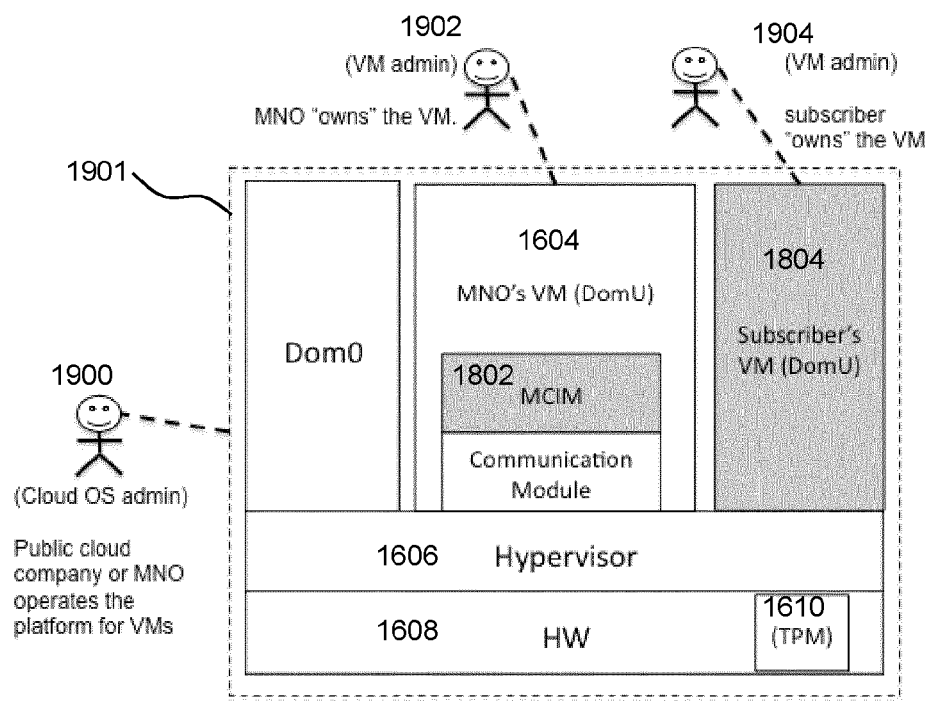
FIG. 19 illustrates schematically how the conceptual structure of the vM2ME of FIG. 18 relates to the parties involved in a service level agreement for the second embodiment.

FIG. 19 illustrates schematically how the conceptual structure of the vM2ME 1800 of FIG. 18 relates to the parties involved. In this embodiment a Cloud OS administrator 1900 operates the virtualization platform (vM2MEP 1901) and the MNO 1902 owns the MNO's VM 1604 that runs in the virtual domain, while the subscriber 1904 is the owner of the MCIM 1802 and associated VM 1804. The Cloud OS administrator 1900 may be the third party public cloud provider company (who is trusted, from the point of view of the MNO), or could be the MNO 1902 who operates the platform under an arrangement with the third party cloud provider.

Note that in this embodiment, the Subscriber 1904 creates its own VM image, which is untrusted from the viewpoint of the MNO 1902, and thus cannot contain the subscriber's MCIM 1802. Therefore, the MCIM 1802 must be stored/executed in a separate VM that is trusted by MNO 1902. To bind the subscriber-VM 1804 with the trusted MNO's VM 1604, the MNO 1902 must deploy both VMs. This allows a valid association between the VMs to be created. In other words, the MNO 1902 requests resources for both the VMs from a public cloud on behalf of the subscriber 1904.

Figure 20:
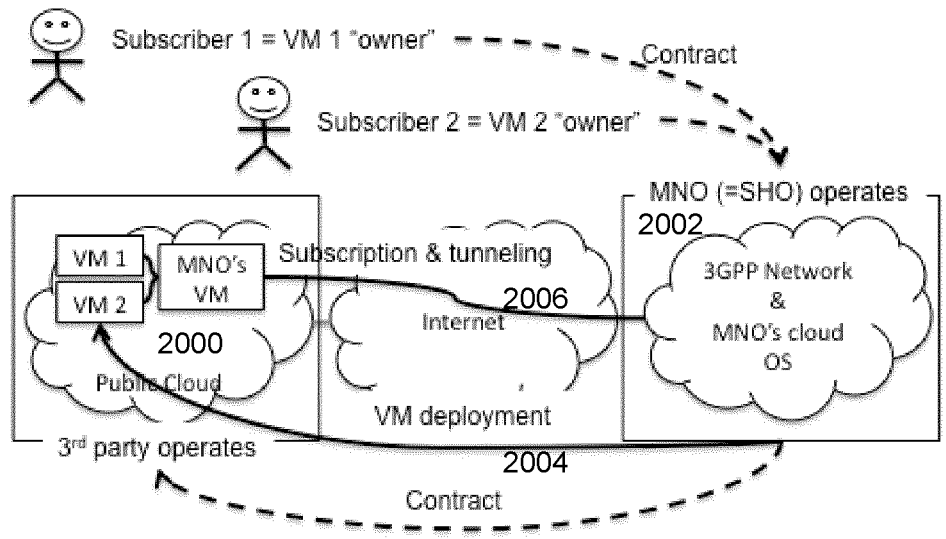
FIG. 20 illustrates schematically one alternative exemplary use case for the second embodiment.

FIG. 20 illustrates schematically the scenario where two VMs, VM1 and VM2, owned by two subscribers, Subscriber 1 and Subscriber 2, are running in a third party's public cloud 2000. The MNO 2002 operates as SHO for the subscribers. The MNO 2002 does not have administrative access to the third party's Cloud OS or management domain (dom0). Therefore, the MNO 2002 needs to run its own guest domain (domU) in the public cloud 2000 for the MCIMs and CMs in order to serve its customers' (Subscribers 1 and 2) VMs. In FIG. 20, the dashed lines illustrate the contractual relationships between the parties, while the solid line 2004 indicates the deployment of the VMs and solid line 2006 indicates the signal path for subscriptions and communications between the 3GPP MNO/SHO 2002 and the VMs.

Figure 21:
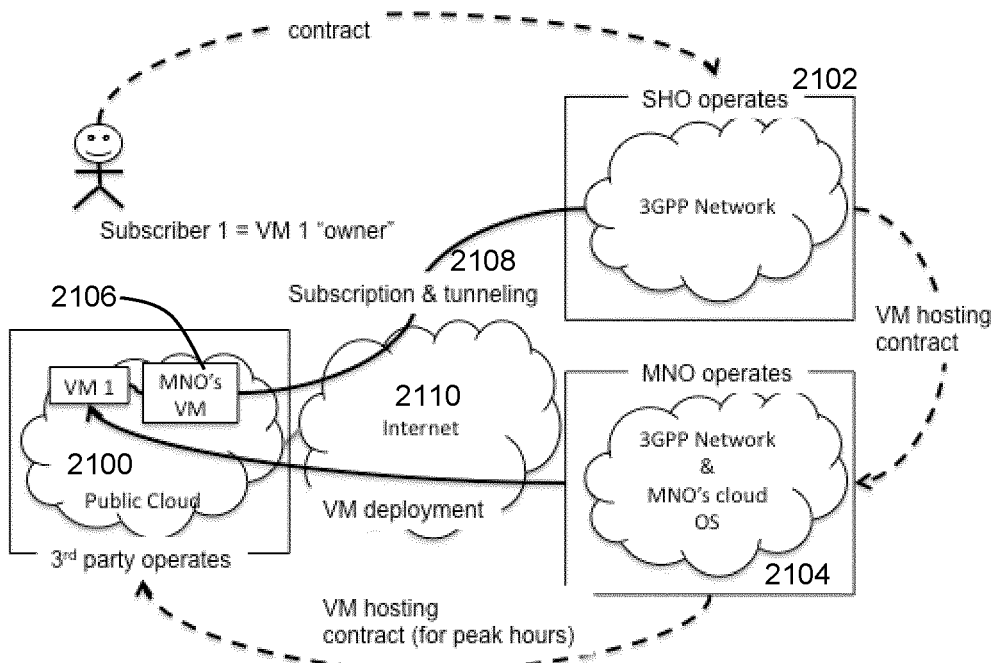
FIG. 21 illustrates schematically another alternative exemplary use case for the second embodiment.

In another scenario, depicted in FIG. 21, subscribers are allowed to select their SHO, independently of the MNO is managing the M2MEP in a public cloud 2100. In this case, the SHO 2102 does not need to have its own data-center (M2MEP), but can have a contract with another MNO to provide a M2MEP for its clients. For example operator-A (SHO) rents resources from operator-B (other MNO). This results in a new business case between operators. For example, normally a MNO might run subscribers' VMs in its own data-center, but during peak hours it might be forced to migrate them to a public cloud. As shown in FIG. 21 Subscriber 1 has selected SHO 2102 that further has a contract with another MNO 2104 to provide a M2MEP for the SHO's clients. In this case, the other MNO 2104 acts as a logical roaming mobile operator for Subscriber 1. The MNO 2104 has a contract with the provider of public cloud 2100 to host VMs (e.g. during peak hours). The MNO 2104 runs its own VM instance 2106 for hosting the MCIM and CM that are associated with the Subscriber's VM, VM1, in the public cloud 2100. As shown the 3GPP signals, subscription and tunneling 2108 can proceed directly (e.g. over the internet 2110) between the MNO's 3GPP network 2102 and the MNO's VM 2106 in the public cloud 2100.

This second embodiment describes the vM2ME concept when the MCIM and CM reside in a MNO's VM. The MCIM is deployed together with the related Subscriber-VM. The CM is associated with a vNIC and the vNIC is further associated with the Subscriber-VM. Typically, the associations will be implemented by vSwitch, although they could also be expressed with certificates. Although the examples are described mainly for the case where the MNO's VM is deployed in a public cloud, it could be deployed in the MNO's own cloud or in some other operator's (e.g. Telco) cloud, and the functionality is the same regardless of which of these is used.

Figure 22:
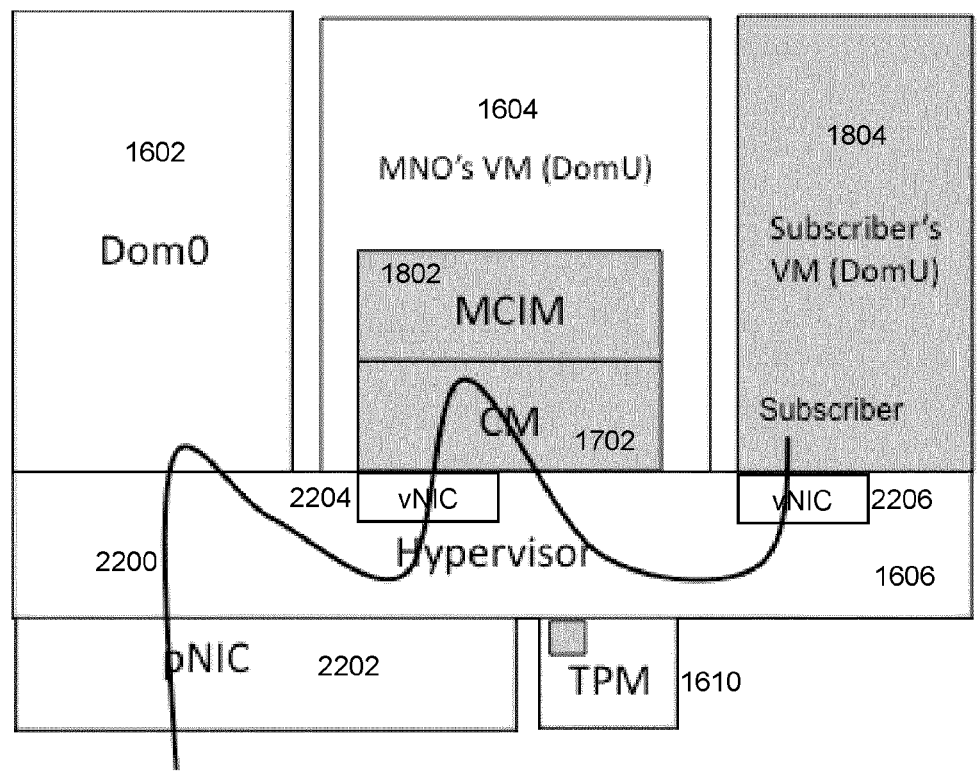
FIGS. 22, 23 and 24a-24d illustrate various alternative signal paths in the conceptual layered structure of the vM2ME for the second embodiment.

FIG. 22 illustrates conceptually the signal path for the basic case as shown in FIG. 18, where the CM 1702 running on the MNO's VM 1604 is associated at minimum with two vNICs 2204, 2206. One vNIC 2204 provides connectivity between the MNO's VM 1604 and the 3GPP network, and the other vNIC 2206 provides connectivity with the Subscriber-VM 1804. The basic configuration illustrated in the FIG. 22 is for the situation where the MNO's VM 1604 and Subscriber-VM 1804 run on the same hypervisor 1606 (i.e. are in the same cloud). The signal path 2200 from the 3GPP network (not shown) passes through a pNIC 2202, through the hypervisor 1606 and Dom0 1602, via vNIC 2204 to the CM 1702, and on via vNIC 2206 to the Subscriber-VM 1804.

As discussed above, there may be situations, such as in a load-balancing scenario, where the MNO's VM and Subscriber-VM run on different hypervisors (clouds). The configuration is illustrated in the FIG. 23. The subscriber-VM 2300 resides in a second (public) cloud on a second hypervisor 2302, with a second Dom0 2304 and a second pNIC 2306. The signal path 2308 from the 3GPP network (not shown) passes through the first pNIC 2202, the first hypervisor 1606 and Dom0 1602 to the CM 1702 in the MNO's VM 1604 (as in FIG. 22). It then passes back via the first hypervisor 1606 and Dom0 1602, first pNIC 2202 and on to the second cloud via second pNIC 2306, second hypervisor 2302 and Dom0 2304 to the Subscriber-VM 2300. The communication between the hypervisors 1606, 2302 has its confidentiality and integrity protected using the data-center's internal security mechanisms, i.e. based on the SLA between the MNO and the public cloud company.

Figure 23:
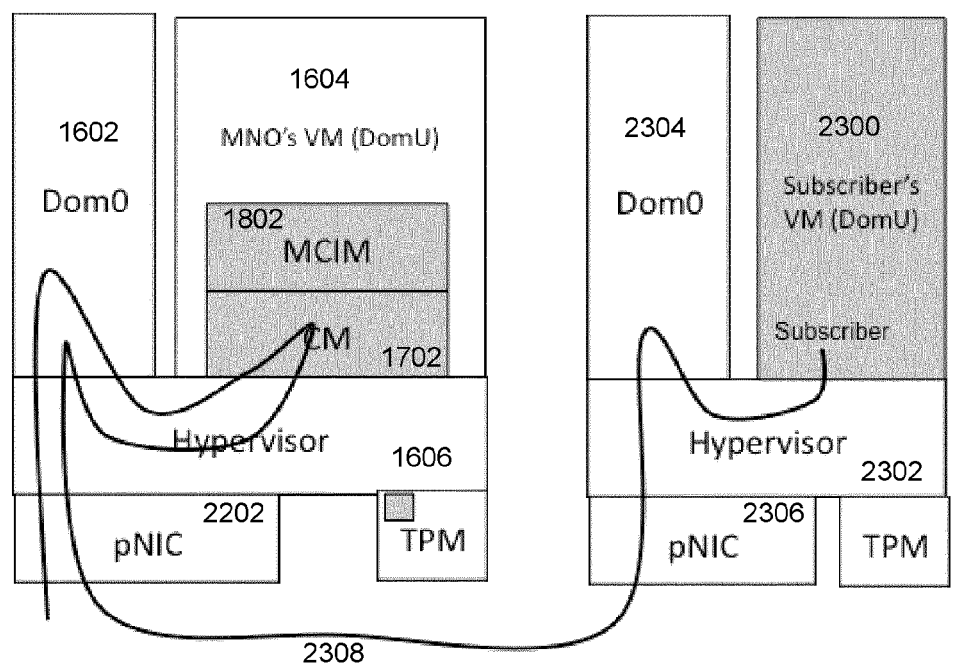
Figure 24A:
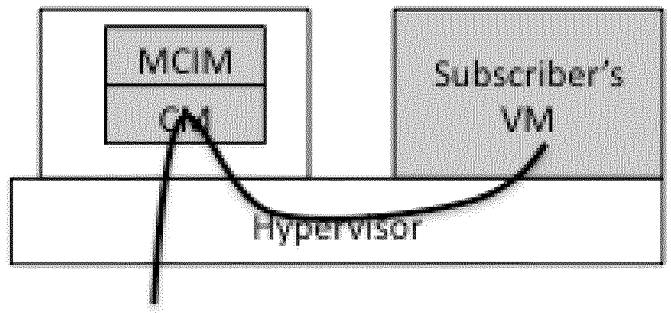
Figure 24B:
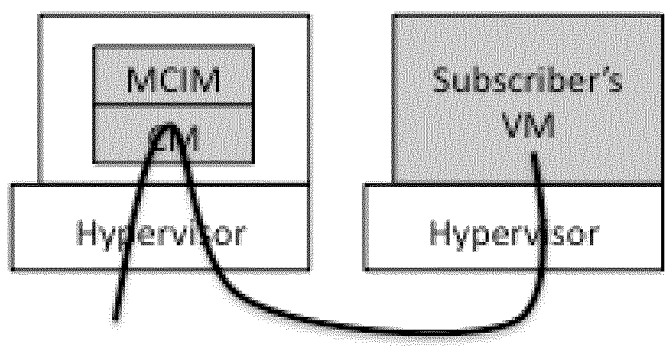
Figure 24C:
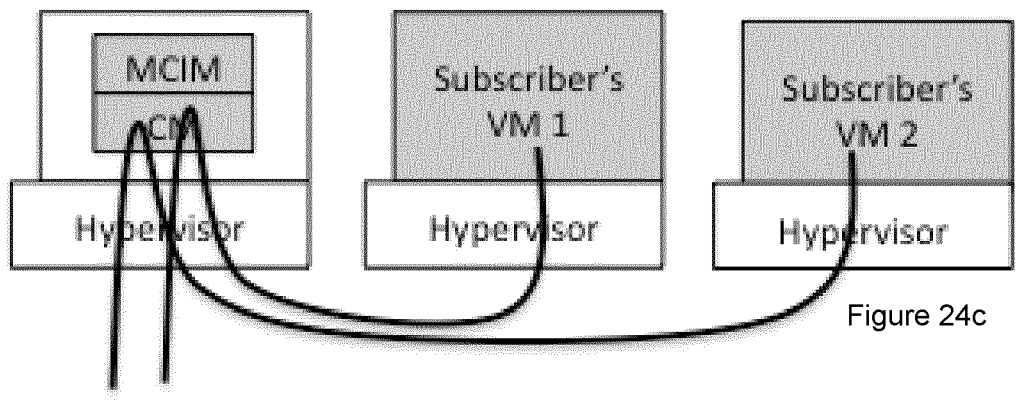
Figure 24D:
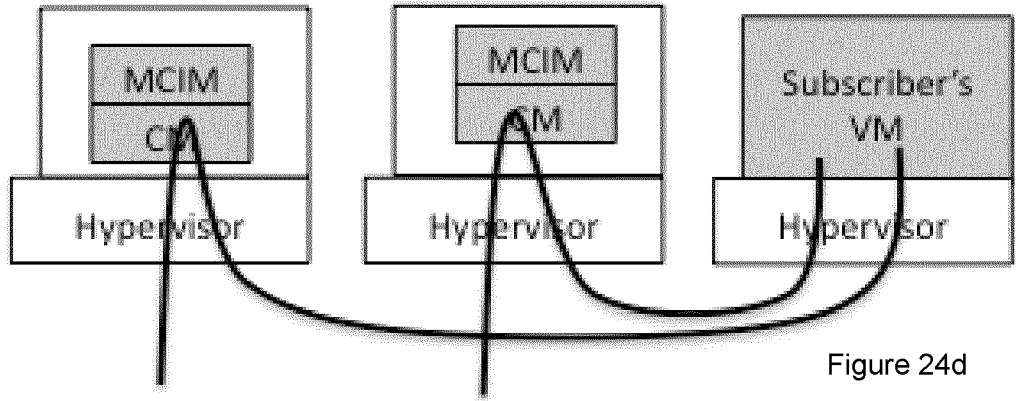

FIGS. 24a and 24b are simplified versions of FIGS. 22 and 23, with the pNICs and Dom0s and reference numerals removed. FIGS. 24c and 24d illustrate conceptually some further configuration alternatives for Subscriber-VMs according to this second embodiment. In all the configurations shown in FIGS. 24a-d, the 3GPP specific (GTP or IPsec) tunnel is terminated at the CM. In FIG. 24c two Subscriber-VMs are deployed in separate clouds with the 3GPP communications to/from the VMs being provided via the same MNO's VM in a different cloud. In FIG. 24d a Subscriber-VM is deployed in one cloud and 3GPP communications are provided via two separate CM/MCIMs each residing in a different MNO's VM in different clouds. The traffic flows between VMs are protected by the Cloud OS (data-center internal) packet confidentiality and integrity mechanisms.

Figure 25:
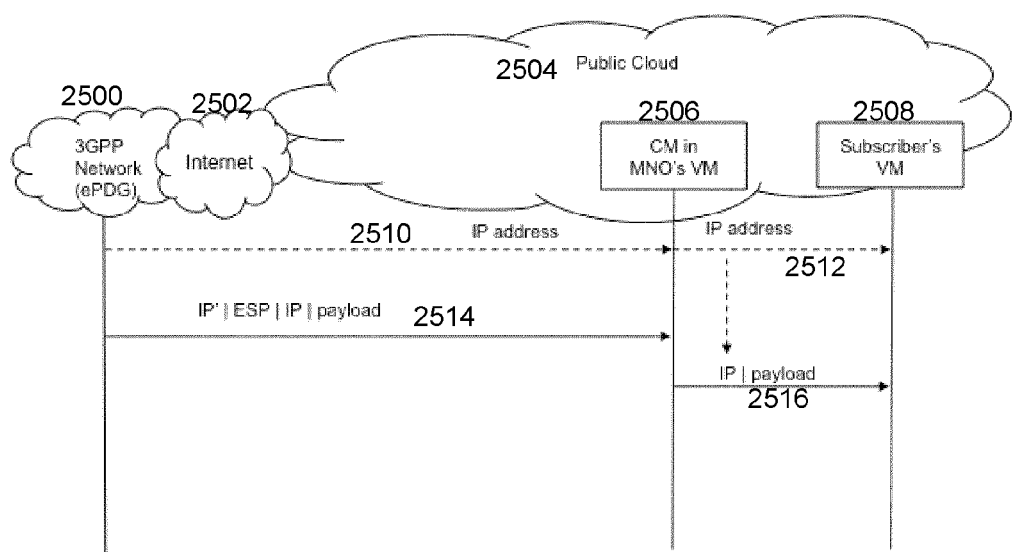
FIGS. 25 to 27 are signal flow diagrams showing the sequence of signals between the entities involved for a number of alternatives of the second embodiment.
Figure 26:
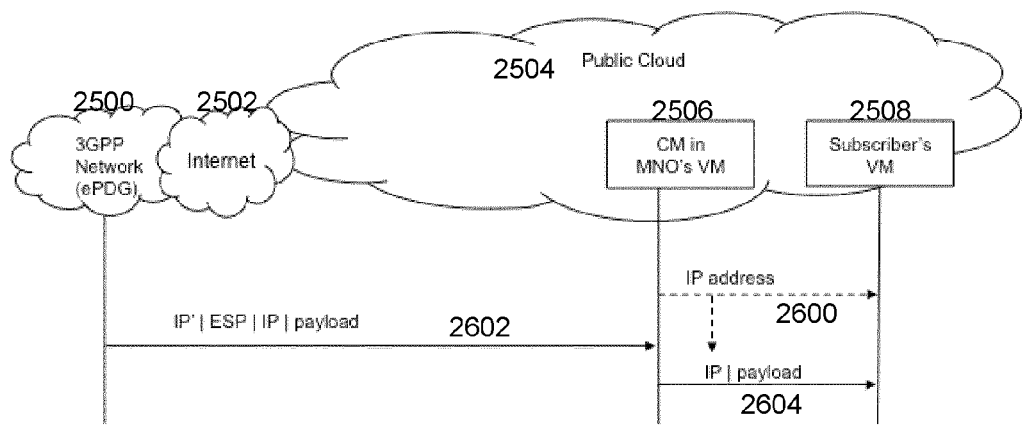
Figure 27:
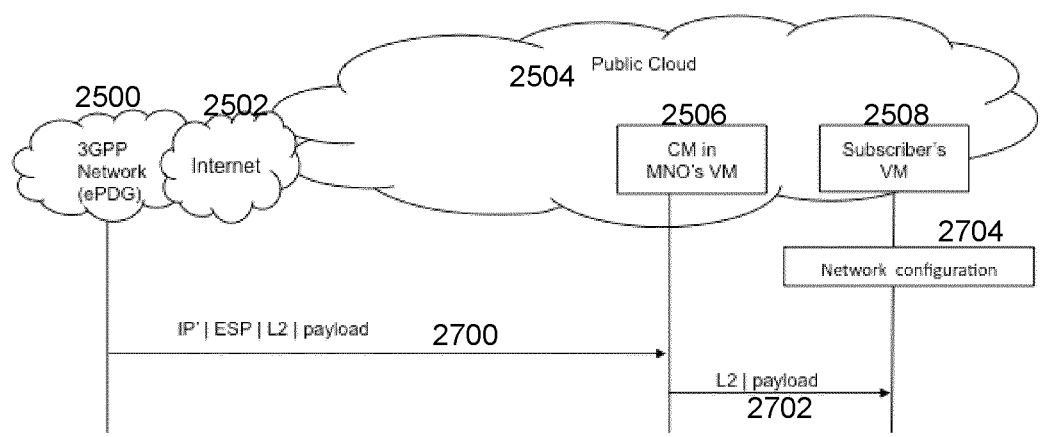

FIGS. 25 to 27 are signal flow diagrams illustrating the packet flow between the 3GPP network 2500 and the Subscriber-VM 2508 for various design options according to this second embodiment. In all cases the CM 2506 in the MNO's VM obtains an IP address from the 3GPP network 2500 (shown as signal 2510) and operates as the IPsec or GTP tunnel end-point from the 3GPP viewpoint. In the first option, shown in FIG. 25, the CM 2506 provides the Subscriber-VM 2508 with the same IP address that it got from the 3GPP network (e.g., with Dynamic Host Configuration Protocol, DHCP) in signal 2512. When the CM 2506 receives a packet at signal 2514, it only removes the tunnel header from the packet and forwards it to the Subscriber-VM 2508 in signal 2516. This solution is similar to that shown in FIG. 12 for the first embodiment.

FIG. 26 illustrates a second design option for the case where the MNO providing the vM2MEP may be different to the SHO that is providing the 3GPP subscription for the subscriber-VM 2508. In this case the MNO allocates an IP address for the Subscriber-VM 2508 as shown at signal 2600. Thus, when the CM 2506 receives the data packet at signal 2602, it removes the tunnel header and forwards the packet to the Subscriber-VM 2508 using the allocated IP address, in signal 2604.

FIG. 27 illustrates a third design option, in which the CM 2506 operates as a normal tunnel end-point and, when receiving a packet in signal 2700 forwards the raw packet (with L2 data and payload) to the Subscriber-VM 2508 in signal 2702. At 2704, the subscriber-VM 2508 (or domain administrator) configures the L2 identifiers. This solution works well in communications from subscriber-VM to subscriber-VM, and provides a Layer-2 solution between VMs. This solution is similar to that shown in FIG. 14 for the first embodiment.

Figure 28:
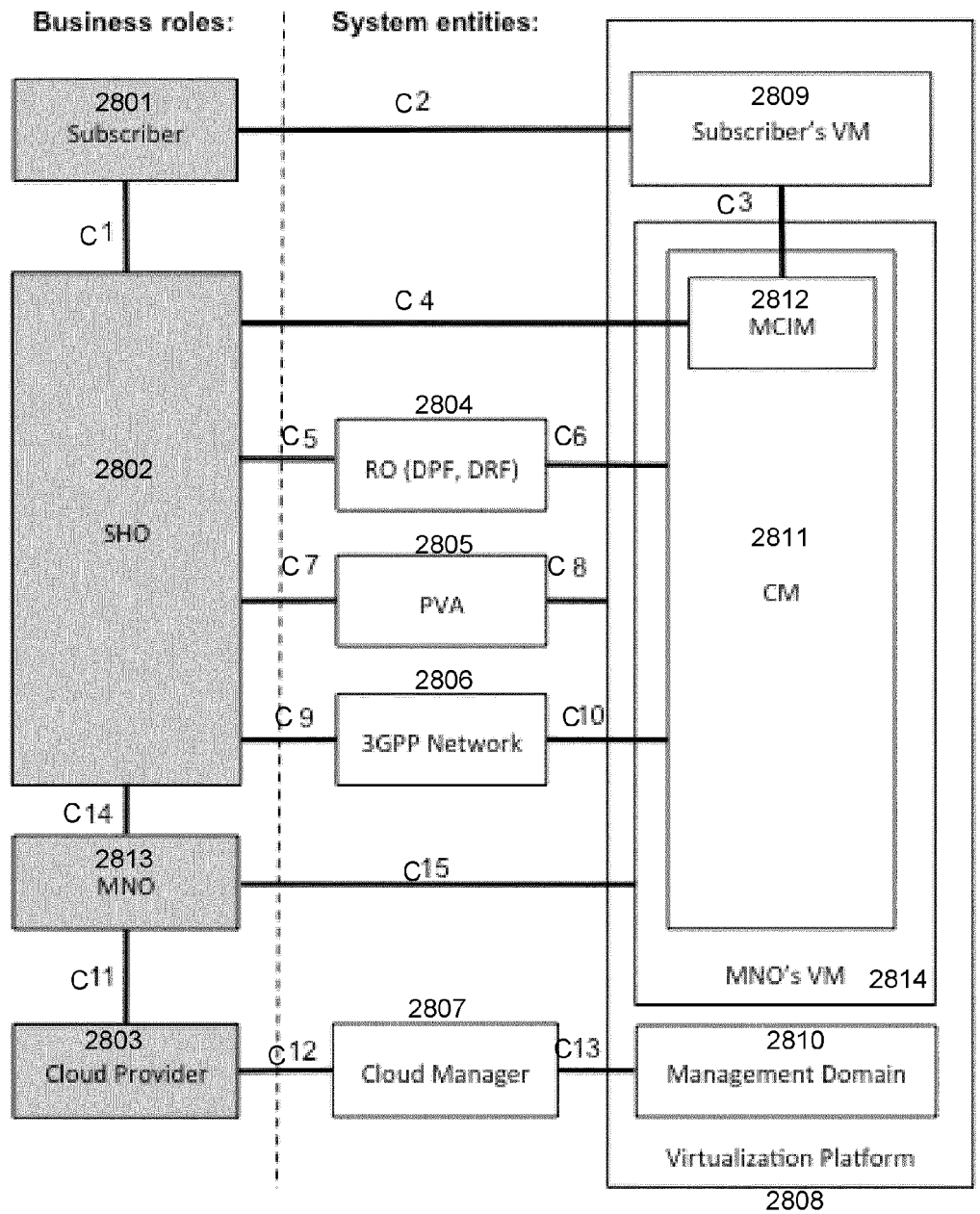
FIG. 28 is a block diagram illustrating the arrangement and communication paths between the entities for the second embodiment.

FIG. 28 is a block diagram showing how the various entities described in this second embodiment are connected or inter-related, and is similar to the diagram of FIG. 15 for the first embodiment. On the left-hand side are shown the business roles or parties involved, including the subscriber 2801 who is the owner of a VM, the Selected Home Operator (SHO) 2802, a Mobile Network Operator (MNO) 2813 of the 3GPP network who in this embodiment is not necessarily the same as the SHO 2802, and the Cloud Provider 2803. On the right-hand side are shown the system entities. These include: a Registration Operator (RO) 2804 that takes care of the registration and provisioning functions, including the Discovery and Registration Function (DRF) and Download and Provisioning Function (DPF); a Platform Validation Authority (PVA) 2805 that provides the attestation services for the TRE; a 3GPP network 2806; a cloud manager 2807; and a virtualization platform 2808. The virtualization platform 2808 includes the subscriber's VM (or VMs—i.e. the vM2ME) 2809, the management domain (hypervisor and Dom0) 2810, and MNO's VM 2814 within which are installed the CM 2811 and associated MCIM 2812.

The connections numbered C1 to C13 are as follows are essentially the same as described in FIG. 15 for the first embodiment. In addition, for the situation where the MNO 2813 is not the same as the SHO 2802, there is a connection C14, based on a roaming agreement between the SHO 2802 and MNO 2813, and the connection C15 indicates the ownership of the MNO's VM 2814 by the MNO 2813.

In this second embodiment, the subscriber's MCIM is integrated with a 3GPP communication stack running in a MNO's trusted VM. As a result, the subscriber's untrusted VM can be connected to a 3GPP network. This is different to the first embodiment in that the MNO does not have configuration privileges for the management domain (dom0). This embodiment also allows the MNO to utilize a third party's cloud infrastructure. The MNO can deploy VMs in a third party's cloud, for example during peak hours. The solution is transparent from the point of view of the VMs, and allows the establishment of virtual private networks (VPNs) between the VMs in the MNO's private cloud and VMs in a public cloud. As with the first embodiment, the MNOs can directly utilize charging functions and services found in the 3GPP networks. The solution allows new kinds of business models between operators and between operators and $3^{rd}$ party cloud providers.

Third Embodiment

MCIM and CM are Located in the Same Virtual Machine where the Subscriber's Service in Running In this embodiment, the definitions of terms are mainly the same as those used in the first and second embodiments and/or the original ones used in 3GPP TR 33.812, except as follows.

Communications Module (CM): one or more 3GPP CMs are executed in an MNO's VM. The CM operates as a gateway for the services running in the MNO's VM, interacts with the MNO's 3GPP network, and sets up the necessary tunneling (e.g. using IPsec or GTP tunneling) with the Evolved Packet Data Gateway (ePDG). As a result, the traffic between the 3GPP network and the CM is authenticated by the MCIM. Connecting to the ePDG uses a non-3GPP access, which can be either trusted or untrusted. If untrusted, the connection should be done using IPsec. If trusted, the connection between the 3GPP device and the access network is protected by access network specific methods. The operator can decide whether to treat the non-3GPP access network as trusted or untrusted.

vM2ME: is a service running in the MNO's VM that is associated with an MCIM. An M2MEP is required for running the vM2ME. The MCIM and related services are deployed together.

M2MEP: this binds the TRE and MNO's VM together, thereby fulfilling the requirements for running vM2MEs.

MNO's VM: the MNO has acquired resources from a third party (e.g. public cloud) to run the MNO's VM image (in DomU), where it runs one or more instances of CM.

Subscriber: this is an entity that owns a vM2ME.

In this third embodiment there is no Subscriber's VM, but instead the MNO's VM operates as a platform for its customers' certified services (processes). For example, the MNO may certify the services itself, or may use a trusted third party to certify the services. In other words, the MNO's VM is a Platform-as-a-Service. This approach requires a strict sandboxing at the VM's operating system level for user processes (similar to FreeBSD jail or Linux containers). The MNO's VM is a service platform that is created by the MNO. The VM can host one or more MCIMs. The binding between services and MCIM takes place in the VM's Operating System (OS).

Figure 29:
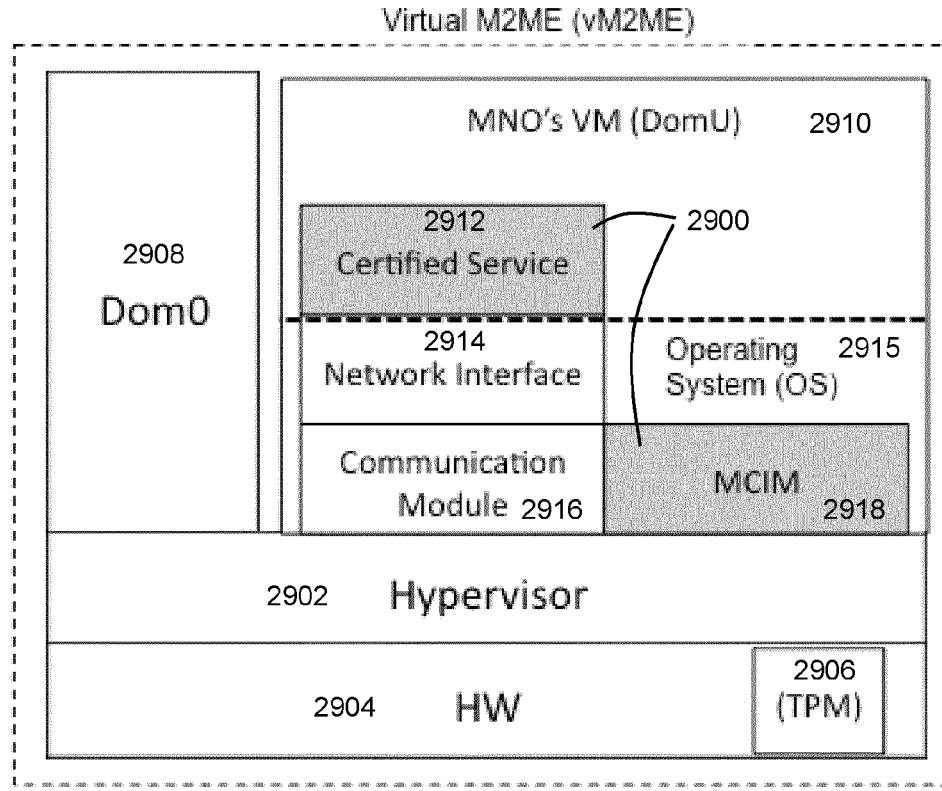
FIG. 29 illustrates a vM2ME using the layered concept introduced in FIG. 1, for a third embodiment.

FIG. 29 illustrates the vM2ME 2900 using the layered concept as previously described. In this case a VMM (hypervisor) 2902 of a third party's cloud platform resides on hardware 2904. As with the second embodiment, there is a TRE which is optionally based on a TPM 2906. The VMM 2902 supports a Dom0 2908 of the virtualization platform, as well as the MNO's VM 2910 (in DomU). The MNO's VM 2910 includes a certified service 2912, a network interface 2914, and an operating system (OS) 2915 as well as one or more CM 2916 and associated MCIM 2918.

Figure 30:
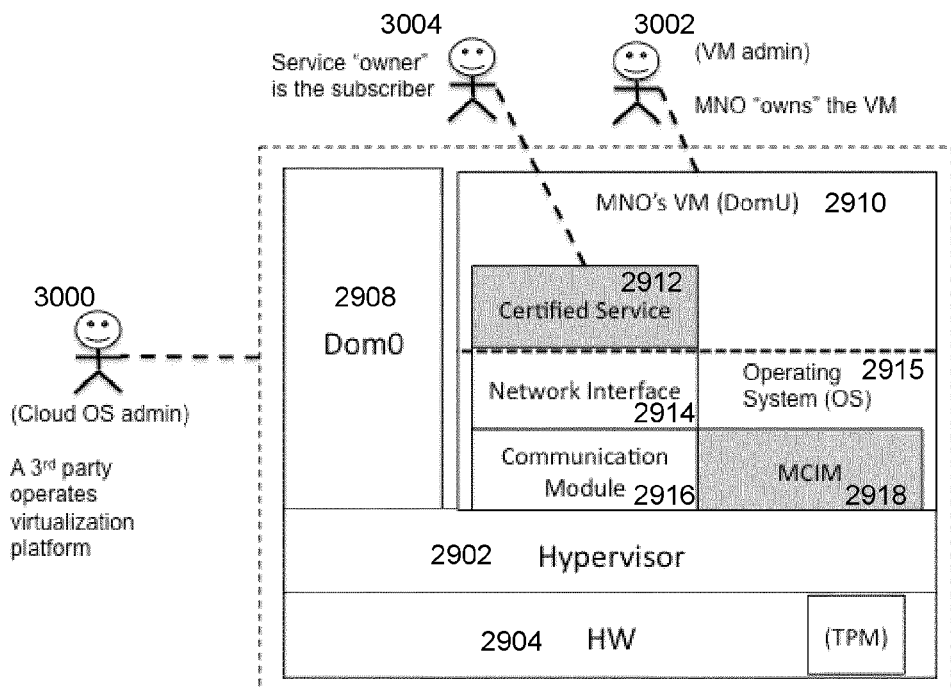
FIG. 30 illustrates schematically how the conceptual structure of the vM2ME of FIG. 29 relates to the parties involved in a service level agreement for the third embodiment.

FIG. 30 illustrates schematically how the conceptual structure of the vM2ME 2900 of FIG. 29 relates to the parties involved. In this embodiment the third party's Cloud OS administrator 3000 operates the virtualization platform. The MNO 3002 owns and is the administrator of the MNO's VM 2910, while the subscriber 3004 is the owner of the MCIM 2918. The MNO operates the MNO's VM 2910 to provide the certified services on behalf of the subscriber. Thus, the MNO acts as a Selected Home Operator (SHO) for the services that are running in the third party's cloud.

Figure 31:
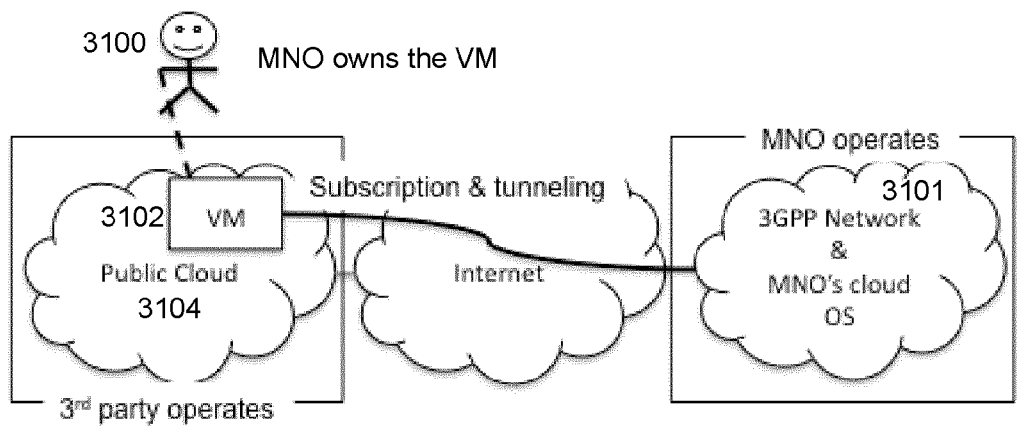
FIG. 31 illustrates schematically an exemplary use case situation for the third embodiment.

FIG. 31 is a schematic illustration of this embodiment. An MNO 3100 is the operator of a 3GPP network 3101, and provides services from a VM 3102 that it owns but runs in a third party's cloud 3104. The MNO 3100 does not have administrative access to the Cloud OS or Dom0 in the public cloud 3104. The VM 3102 is trusted from the MNO's viewpoint. Alternatively the MNO 3100 can run its customers' (subscribers) certified services in the VM 3102.

Figure 32:
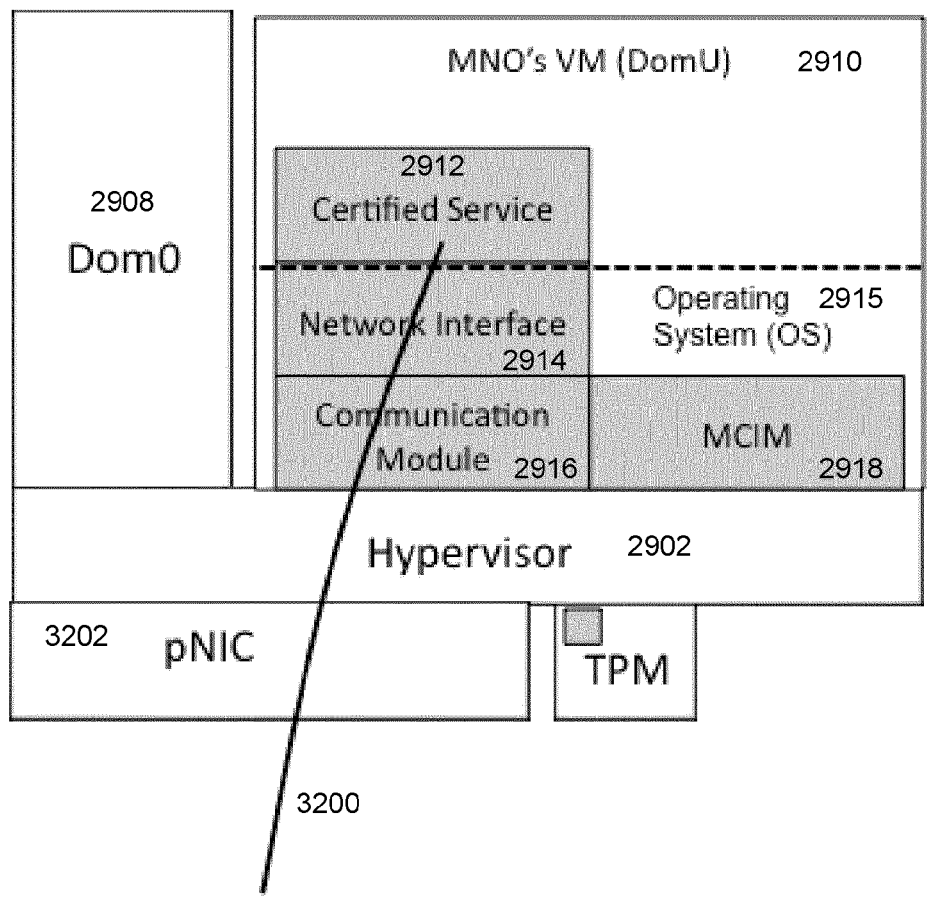
FIG. 32 illustrates the signal path in the conceptual layered structure of the vM2ME for the third embodiment.

FIG. 32 illustrates conceptually the signal path for the conceptual structure shown in FIG. 29. The signal path 3200 from the 3GPP network (not shown) passes through a pNIC 3202, through the hypervisor 2902 to the CM 2916 in the MNO's VM 2910, and then internally within the MNO's VM 2910 via the network interface 2914 to access the certified services 2912.

Figure 33:
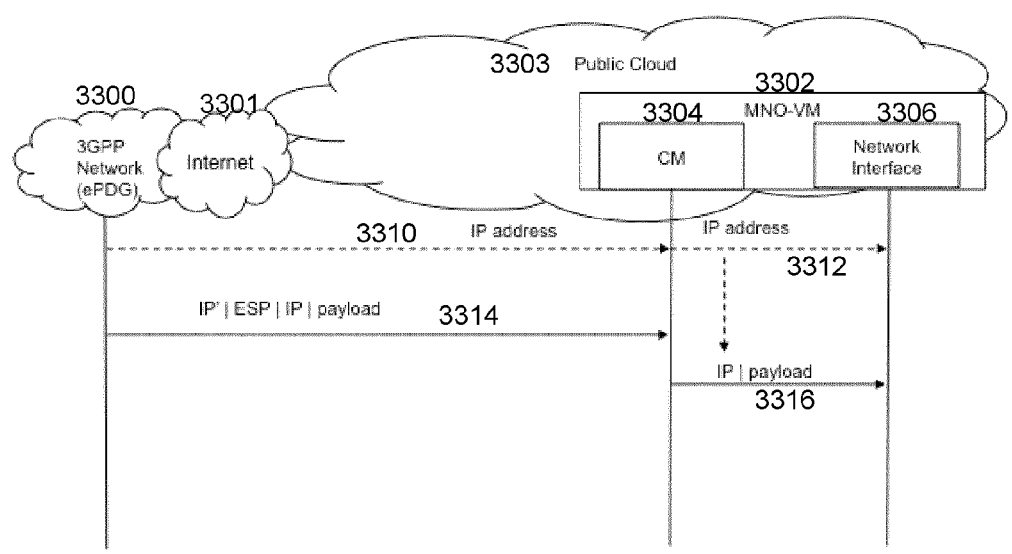
FIGS. 33 and 34 are signal flow diagrams showing the sequence of signals between the entities involved for two alternatives of the third embodiment.
Figure 34:
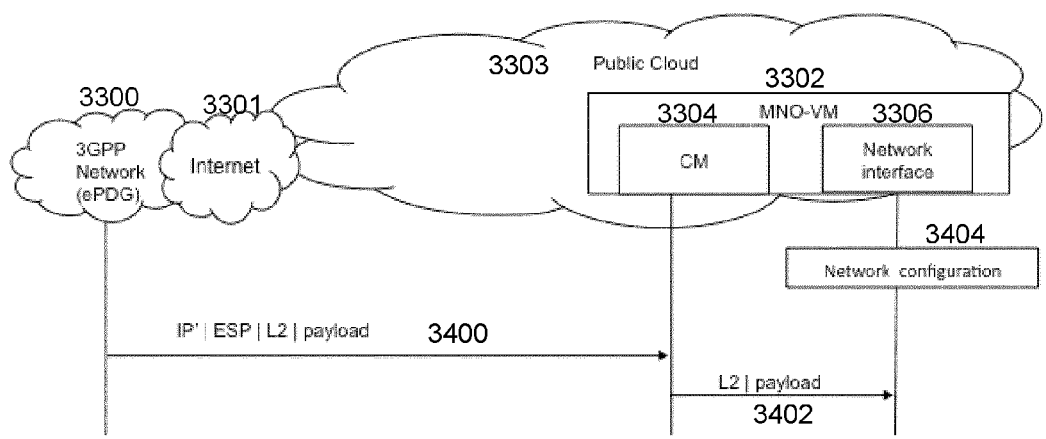

FIGS. 33 and 34 are signal flow diagrams illustrating the packet flow between the 3GPP network 3300 and the MNO-VM 3302 for two design options according to this third embodiment. In both cases the CM 3304 in the MNO's VM 3302 obtains an IP address (e.g., with Dynamic Host Configuration Protocol, DHCP) from the 3GPP network 3300 (shown as signal 3310) and operates as the IPsec tunnel end-point from the 3GPP viewpoint. In the first option, shown in FIG. 33 the CM 3304 provides, in signal 3312, the same IP address that it got from the 3GPP network to the network interface 3306 in the MNO's VM 3302. When the CM 3304 receives a packet at signal 3314, it removes the tunnel header from the packet and forwards it to the network interface 3306 in signal 3316, using the same IP address. This option is similar to that shown in FIG. 12 for the first embodiment and in FIG. 25 for the second embodiment.

FIG. 34 illustrates the second design option, in which the CM 3304 operates as a normal tunnel end-point and, when receiving a packet in signal 3400 forwards the raw packet (with L2 data and payload) to the network interface 3306 in signal 3402. At 3404, the MNO's VM 3302 (or domain administrator) configures the L2 identifiers. This option is similar to that shown in FIG. 14 for the first embodiment and in FIG. 27 for the second embodiment.

Figure 35:
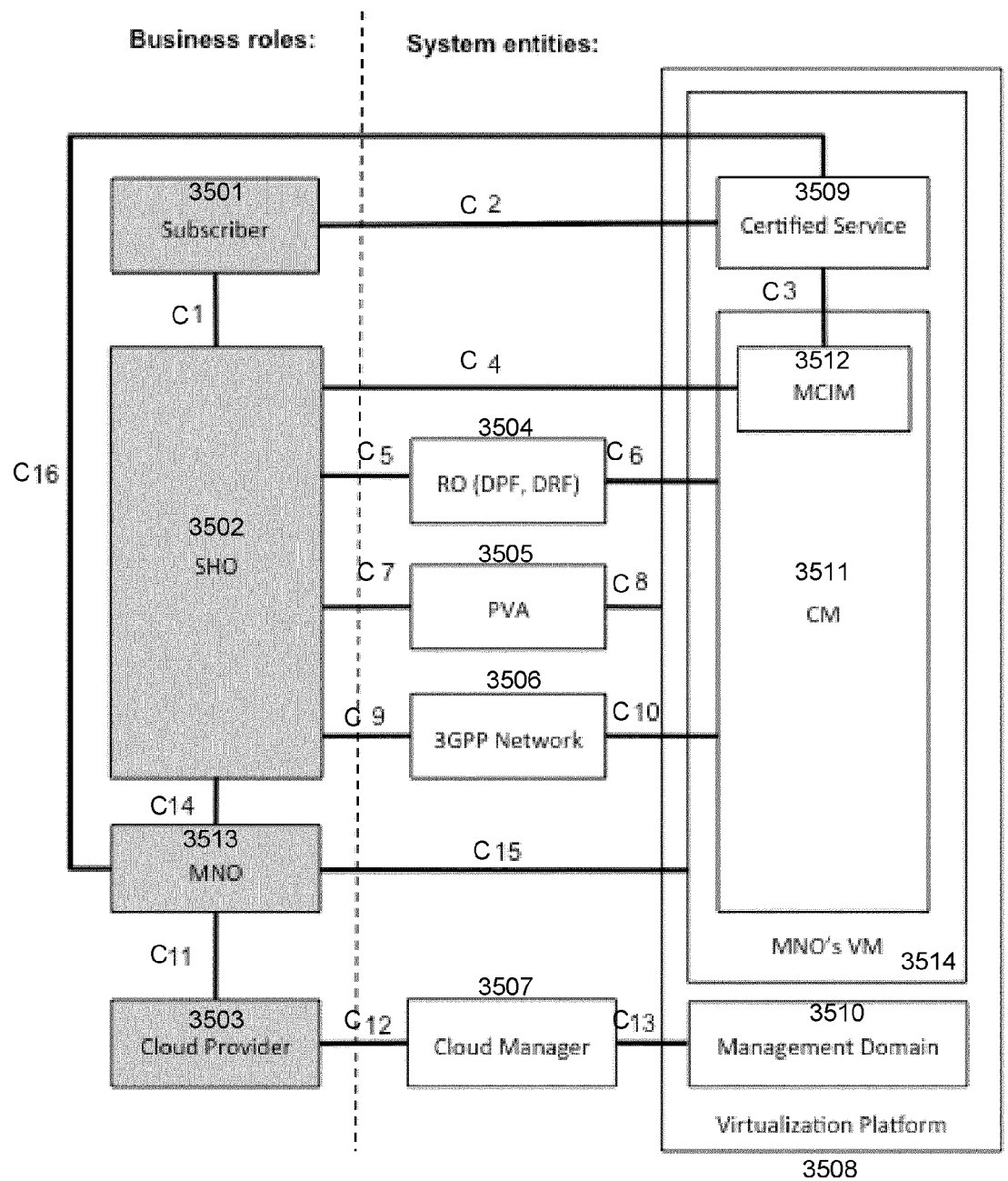
FIG. 35 is a block diagram illustrating the arrangement and communication paths between the entities for the third embodiment.

FIG. 35 is a block diagram showing how the various entities described in this third embodiment are connected or inter-related, and is similar to the diagram of FIG. 15 for the first embodiment and FIG. 28 for the second embodiment. On the left-hand side are shown the business roles or parties involved, including the subscriber 3501 who is the subscriber to VM services provided by the MNO's VM, the Selected Home Operator (SHO) 3502, a Mobile Network Operator (MNO) 3513 of the 3GPP network who in this embodiment is not necessarily the same as the SHO 3502, and the Cloud Provider 3503. On the right-hand side are shown the system entities. These include: a Registration Operator (RO) 3504 that takes care of the registration and provisioning functions, including the Discovery and Registration Function (DRF) and Download and Provisioning Function (DPF); a Platform Validation Authority (PVA) 3505 that provides the attestation services for the TRE; a 3GPP network 3506; a cloud manager 3507; and a virtualization platform 3508. The virtualization platform 3508 includes the certified services 3509 provided to the subscriber 3501 by the MNO 3513, the management domain (hypervisor and Dom0) 3510, and the MNO's VM 3514 within which are installed the CM 3511 and associated MCIM 3512 of the subscriber 3501.

The connections numbered C1 to C15 are as follows are essentially the same as described in FIG. 15 for the first embodiment and in FIG. 28 for the second embodiment. In addition, there is a connection C16, representing the certification process for the certified services 3509 provided by the MNO 3513.

In this third embodiment, the subscriber's MCIM is integrated with a 3GPP communication stack running in an MNO's trusted VM. The subscriber's certified service is run on the MNO's VM and is connected with a 3GPP network. The difference to the second embodiment is that the subscriber does not provide the VM software but only an application (service), which is run on the MNO's VM.

One advantage is that the security requirements are higher for the service but the resource requirements are lower, enabling the running of multiple services in one VM. Another particular advantage of this third embodiment is that because the MCIM is running on the same VM as the certified services, the MNO does not need invest in extra resources for MCIM execution (as in the second embodiment where services cannot be certified). The solution provided by this embodiment is therefore is transparent for the services.

Fourth Embodiment

MCIM and CM are Located on Physical Network Interface Card

In this embodiment, an embedded MCIM application resides on the physical network interface card (pNIC). The example described is based on Peripheral Component Interconnect Express (PCIe) Single Root I/O Virtualization and Sharing (SR-IOV), or PCIe SR-IOV-capable NICs (see "Single Root I/O Virtualization and Sharing Specification" at http://www.pcisig.com/specifications/iov/single_root/ as archived on web.archive.org on 25.12.2010), and these are discussed further below, although programmable NICs also make it possible to implement such functionality.

"Intel® Virtualization Technology For Directed I/O Architecture Specification", (Revision 1.3, February 2011) states:

"A general requirement for . . . I/O virtualization models is the ability to isolate and restrict device accesses to the resources owned by the partition managing the device. Intel® VT for Directed I/O provides VMM software with the following capabilities:

I/O device assignment: for flexibly assigning I/O devices to VMs and extending the protection and isolation properties of VMs for I/O operations.

DMA remapping: for supporting independent address translations for Direct Memory Accesses (DMA) from devices.

Interrupt remapping: for supporting isolation and routing of interrupts from devices and external interrupt controllers to appropriate VMs.

Reliability: for recording and reporting to system software DMA and interrupt errors that may otherwise corrupt memory or impact VM isolation."

The Intel® "PCI-SIG SR-IOV Primer An Introduction to SR-IOV Technology", No 321211-002, Revision 2.5, January 2011,) states:

"The Direct Assignment method of virtualization provides very fast I/O. However, it prevents the sharing of I/O devices. SR-IOV provides a mechanism by which a Single Root Function (for example a single Ethernet Port) can appear to be multiple separate physical devices.

A SR-IOV-capable device can be configured (usually by the VMM=hypervisor) to appear in the PCI configuration space as multiple functions, each with its own configuration space complete with Base Address Registers (BARs). The VMM assigns one or more Virtual Functions (VFs) to a VM by mapping the actual configuration space the VFs to the configuration space presented to the virtual machine by the VMM."

Figure 36:
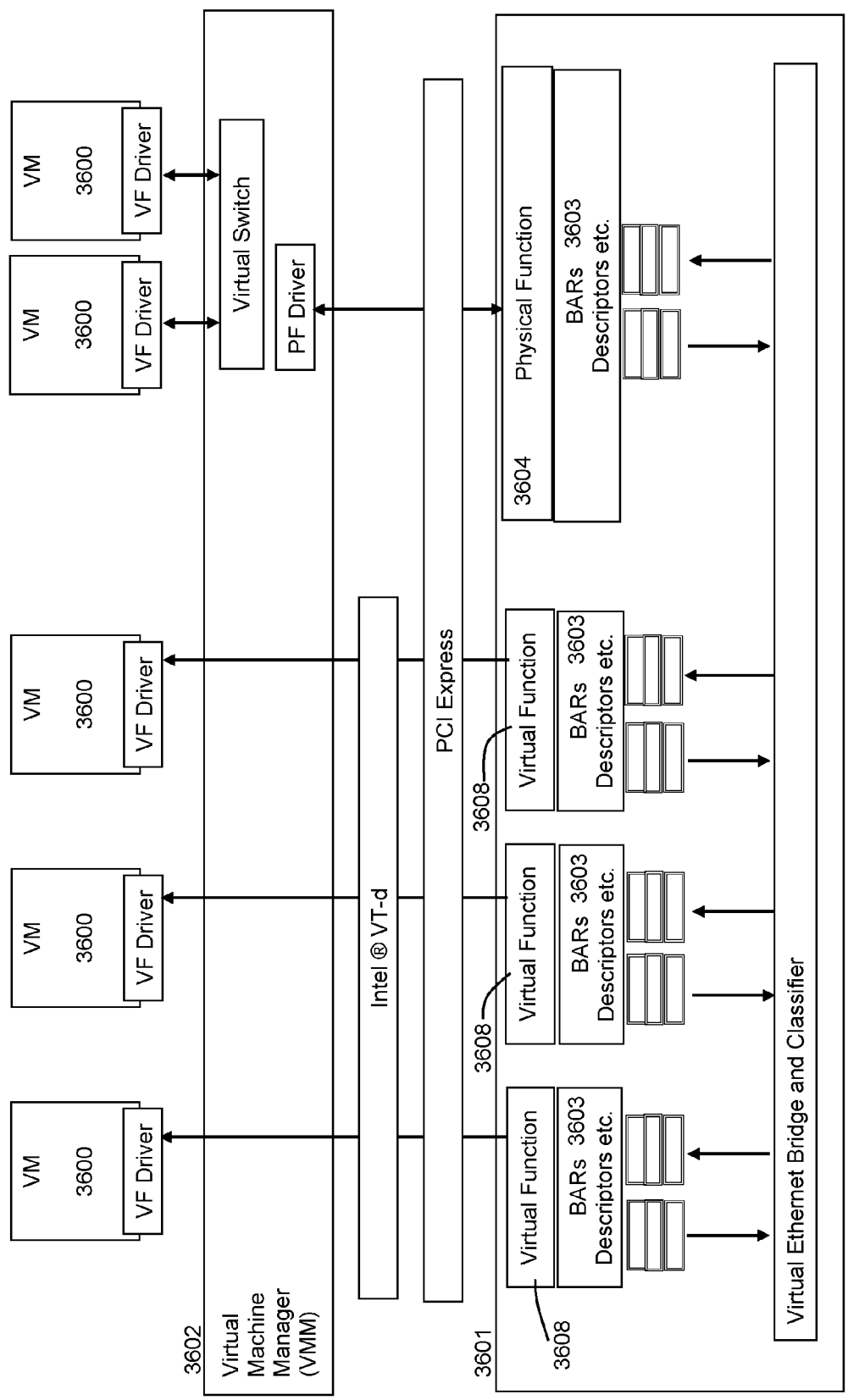
FIG. 36 illustrates conceptually the components of a physical NIC in the layered concept introduced in FIG. 1, for a fourth embodiment.

The following are some important SR-IOV related terms for understanding this embodiment. These features are illustrated schematically in FIG. 36, including a PCIe SR-IOV-capable pNIC 3601.

System Image (SI), which is equivalent to a Virtual Machine (VM) 3600.

Virtualization Intermediary (VI), which is equivalent to a VMM or hypervisor 3602.

Base Address Register (BAR) 3603. Each physical and virtual function has its own configuration space complete with BARs.

Figure 39:
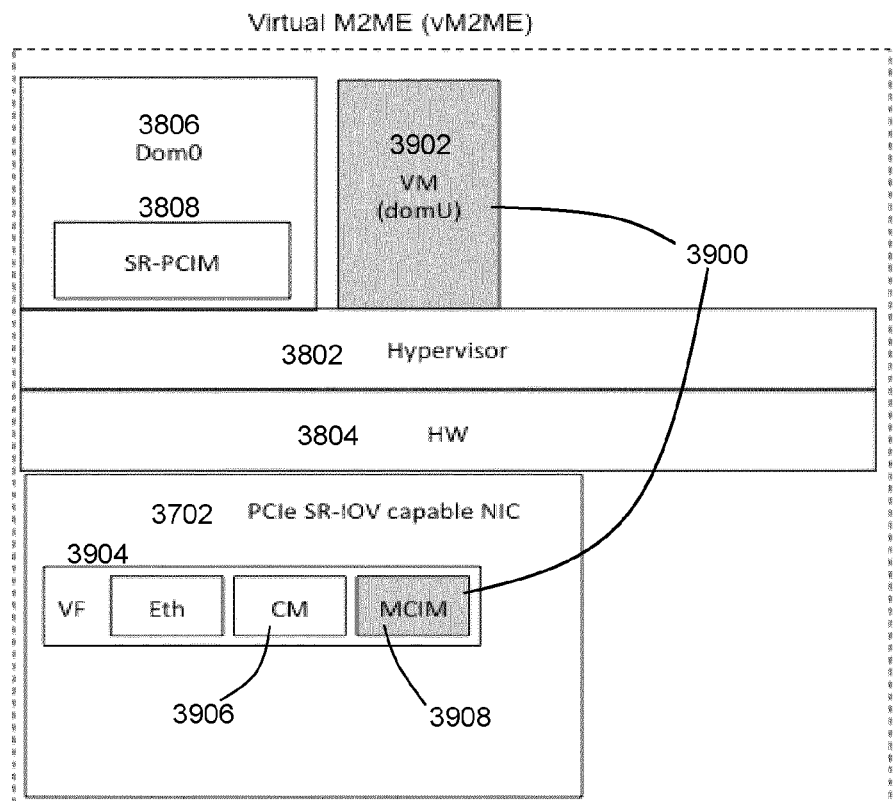
Figure 40:
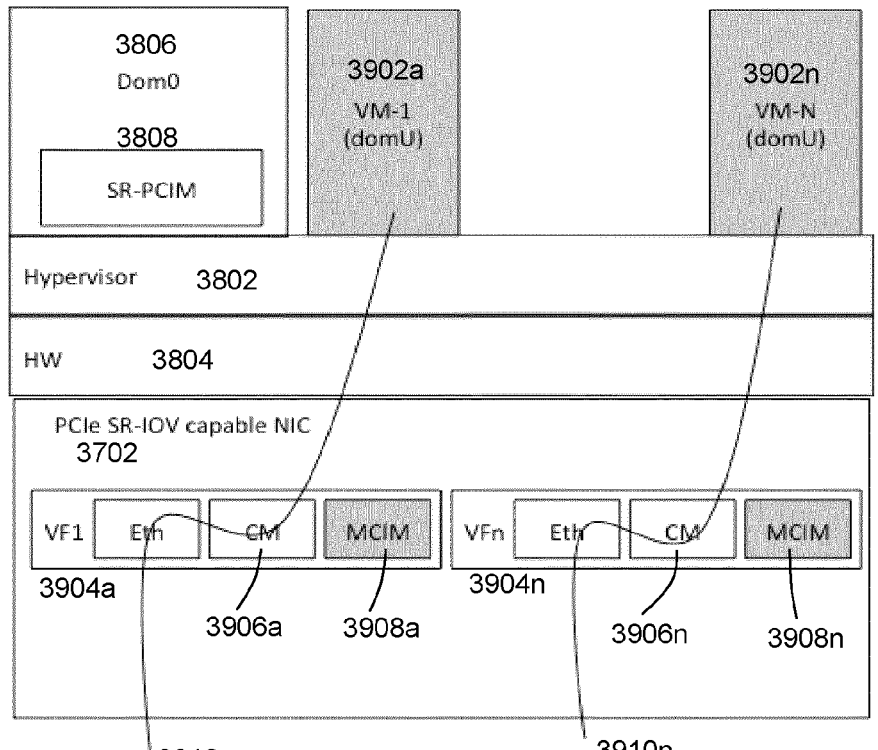
FIGS. 40 and 41 illustrate alternative signal paths in the conceptual layered structure of the vM2ME for the fourth embodiment.
Figure 41:
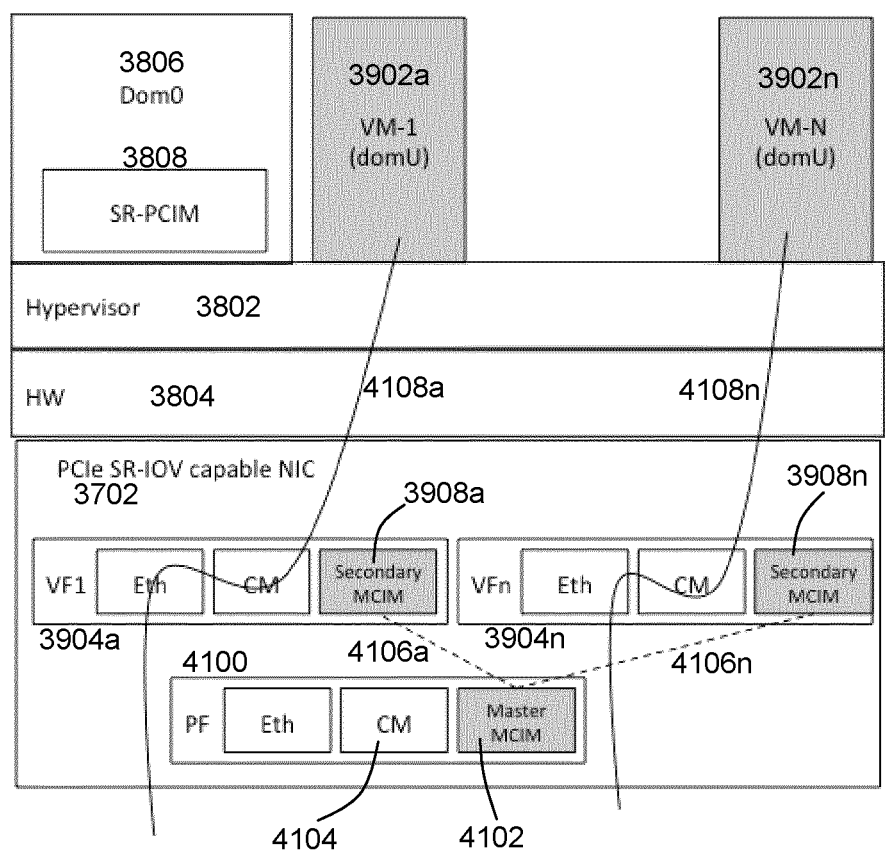

Single Root PCI Configuration Manager (SR-PCIM or PCIM). This is implemented in software that will typically be installed in the management domain (dom0), and so is not shown in FIG. 36, but is shown in FIGS. 39-41. From the "PCI-SIG SR-IOV Primer An Introduction to SR-IOV Technology" referenced above: "SR-PCIM is responsible for configuration and management of the VFs. It is a conceptual model whose definition is outside the scope of the PCI-SIG efforts; the expectation is that this software will be incorporated into the virtualization layer by VMM vendors".

Physical Function (PF) 3604. From the "Intel® Virtualization Technology For Directed I/O Architecture Specification" referenced above: "A PF is a PCIe Function (per the PCI Express Base Specification) that supports the SR-IOV capability and is accessible to an SR-PCIM, a VI, or an SI".

Virtual Function (VF) 3608. From the "Intel® Virtualization Technology For Directed I/O Architecture Specification" referenced above: "A Function that is associated with a Physical Function. A VF shares one or more physical resources, such as a Link, with the Physical Function and other VFs that are associated with the same PF. A VF is a "light-weight" PCIe Function that is directly accessible by an SI.

Minimally, resources associated with the main data movement of the Function are available to the SI. Configuration resources should be restricted to a trusted software component such as a VI or SR-PCIM.

A VF can be serially shared by different SI, i.e., a VF can be assigned to one SI and then reset and assigned to another SI"

This embodiment includes a refinement of the building blocks (i.e. the TRE and M2ME Platform M2MEP) presented in the first, second and third embodiments above applied to a pNIC environment.

The pNIC is PCIe SR-IOV capable (or programmable). The physical resources support, inter alia, run time reconfiguration, a 3GPP communication stack, an embedded SIM (MCIM). The pNIC has N logically separated trusted execution environments implemented as SR-IOV virtual functions (VFs) or similar modules, and includes a safe storage area, which permits writing and may permit reading. In SR-IOV, this is implemented with protected configuration resources using a trusted software component such as a TPM. Each logical environment appears as a physical interface with the hypervisor. In SR-IOV, each VF has its own ePCI bus id.

The TRE is built on the pNIC.
The M2MEP consists of:
The TRE
Physical resources running on the pNIC, including a 3GPP Communication Module (CM)
The Hypervisor and management domain (Dom0)
Directed I/O technology (Intel's® or similar)
SR-IOV's SR-PCIM (or similar)

Figure 37:
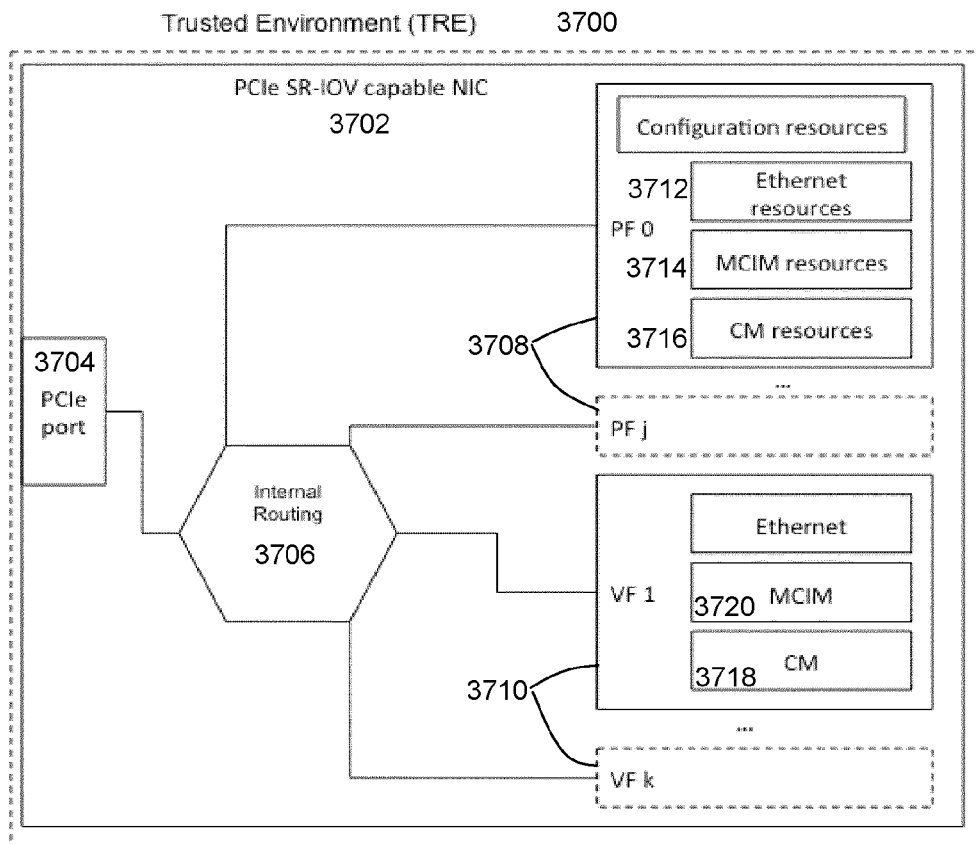
FIG. 37 is schematic block diagram showing the relationship between the components in a PCIe SR-IOV capable NIC.
Figure 38:
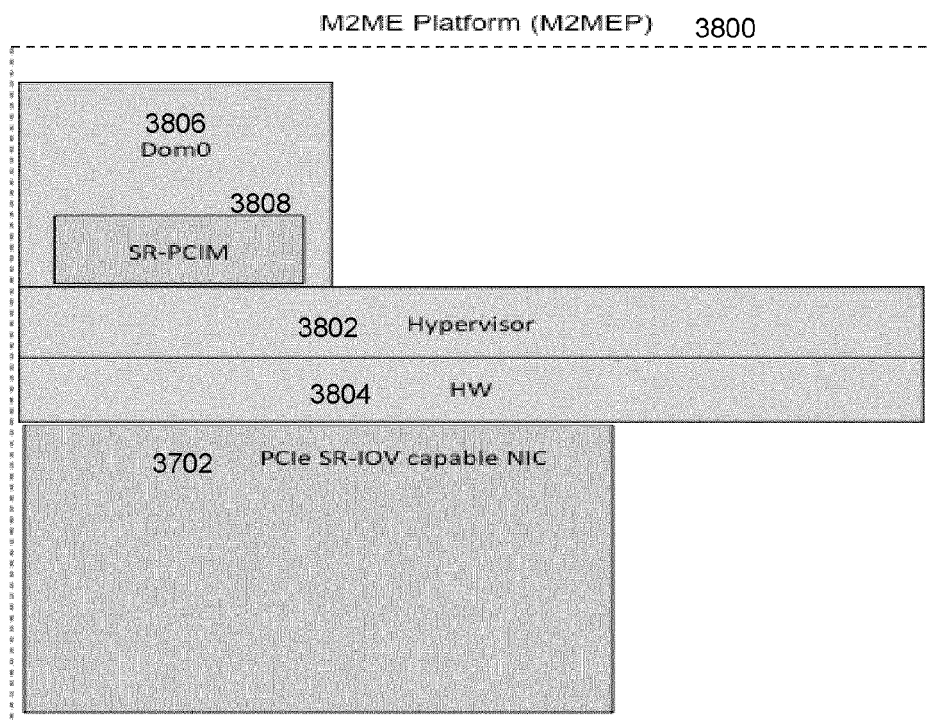
FIGS. 38 and 39 illustrate the conceptual stages in the building of a vM2ME, using the layered concept introduced in FIG. 1, for the fourth embodiment.

FIGS. 37-39 illustrate the building blocks. As shown in FIG. 37, the TRE 3700 is built on the PCIe SR-IOV-capable NIC, pNIC, 3702, which has a PCIe port 3704, an internal router 3706, one or more Physical Functions (PFs) 3708 and one or more Virtual Functions (VFs) 3710. One of the PFs 3708, designated PF0, includes the configuration resources in the form of Ethernet resources 3712, MCIM resources 3714 and CM resources 3716. A CM 3718, which is a 3GPP communication endpoint that establishes an IPsec or GTP tunnel towards 3GPP network, is installed in A VF 3710, together with an associated subscriber's MCIM 3720.

FIG. 38 illustrates the M2MEP 3800, which includes the PCIe SR-IOV capable NIC 3702 (and therefore also the TRE 3700), as well as a hypervisor 3802 on the hardware 3804, and Dom0 3806, in which the SR-PCIM 3808 is installed.

FIG. 39 illustrates conceptually the vM2ME 3900 for this embodiment. This is built on the M2MEP 3800 of FIG. 38 that includes all of the components described above, and consists of a VM 3902 (domU) supported by the VMM (hypervisor) 3802, and an MCIM 3908. In FIG. 39 a single execution environment (VF) 3904 is shown, although there may be multiple such execution environments in the pNIC 3702. Included in the VF 3904 are the CM 3906 and MCIM 3908 associated with the VM 3902.

There are two alternative implementations of this fourth embodiment, as shown by the two alternative signaling paths depicted in FIGS. 40 and 41. These will be referred to respectively as Alternative 4a and Alternative 4b.

In alternative 4a, as depicted in FIG. 40, the pNIC 3702 has N execution environments (VFs) 3904a-3904n, all (or as many as required at any instant—two are shown in FIG. 40) each running a CM instance 3906a, 3906n together with an associated MCIMs 3908a, 3908n, and each associated with a VM 3902a, 3902n. The MCIMs 3908a, 3908n are stored on the secure storage area, which (as shown) may reside in the same secure execution environment as the CM. The MCIMs may also reside in a trusted software component such as a Trusted Platform Module (TPM), located on the physical machine, or on the pNIC itself. The separate paths 3910a, 3910n between the 3GPP network (not shown) and the VMs 3902a, 3902n pass via the CMs 3906a, 3906n in the respective VFs 3904a, 3904n in the pNIC 3702.

Each CM instance 3906a, 3906n is created/allocated at the pNIC 3702 when an MCIM 3908 is deployed. The MCIM 3908 may be deployed before or at the same time as a VM instance 3902. The VM instance 3902 is associated with the execution environment (VF) 3904 running the MCIM 3908 via Directed I/O and SR-IOV technologies. By internal routing at the pNIC 3702 (in router 3706 as shown in FIG. 37), the network traffic flows are separated between the CMs 3906a-3906n. The CMs 3906a-3906n then forward their traffic to the hypervisor 3802. The traffic to the hypervisor may use a single interface (PF—see FIG. 37) using in-band signaling for separating the traffic flows of different VMs 3902 (i.e. VLANs). Alternatively, by enabling the hypervisor 3802 to detect the different VFs 3904 in the pNIC 3702 for each CM 3906, the traffic flows may be separated by the interfaces.

To further improve the security of the system, the MCIMs 3908 could be stored in write-only memory on the pNIC 3702 or on a UICC (not shown) on the pNIC 3702. That would allow only writing of new parameters to the MCIM, but not inspecting the MCIM afterwards, as is the case for physical SIM cards, and thereby preventing a malicious user from extracting vital information from the MCIM.

Provisioning of MCIMs may occur either by manual insertion of a physical MCIM into a UICC slot on the hardware, or by dedicating one of the pNIC's execution environments to a particular MCIM via a management interface (e.g. SR-PCIM), running either in a cloud manager or on a management domain (dom0).

In alternative 4b, shown in FIG. 41, where the same reference numerals as used in FIG. 40 are used for the equivalent features, the pNIC 3702 has a special execution environment/UICC (PF) 4100 for a master/primary MCIM 4102 coupled with an appropriate CM 4104. When the VMs 3902a-3902n are deployed, the master MCIM 4102 is used to bootstrap the MCIMs 3908a-3908n of each VM, similar to what is described in 3GPP TR 33.812. This is shown by the dashed lines signal paths 4106a and 4106n in FIG. 41. Thereafter, the communication paths 4108a-4108n are the same as shown in FIG. 40 and described above. In this alternative 4b, the secondary MCIMs 3908a-3908n do not need a provisioning capability. The master MCIM 4102 creates a secure channel over which the secondary MCIMs 3908a-3908n are downloaded and stored on the pNIC 3702 in their own execution environments. This alternative is suitable for applications that provide a MNO's own services or specialized customer services that are inherently trusted by the MNO.

Figure 42:
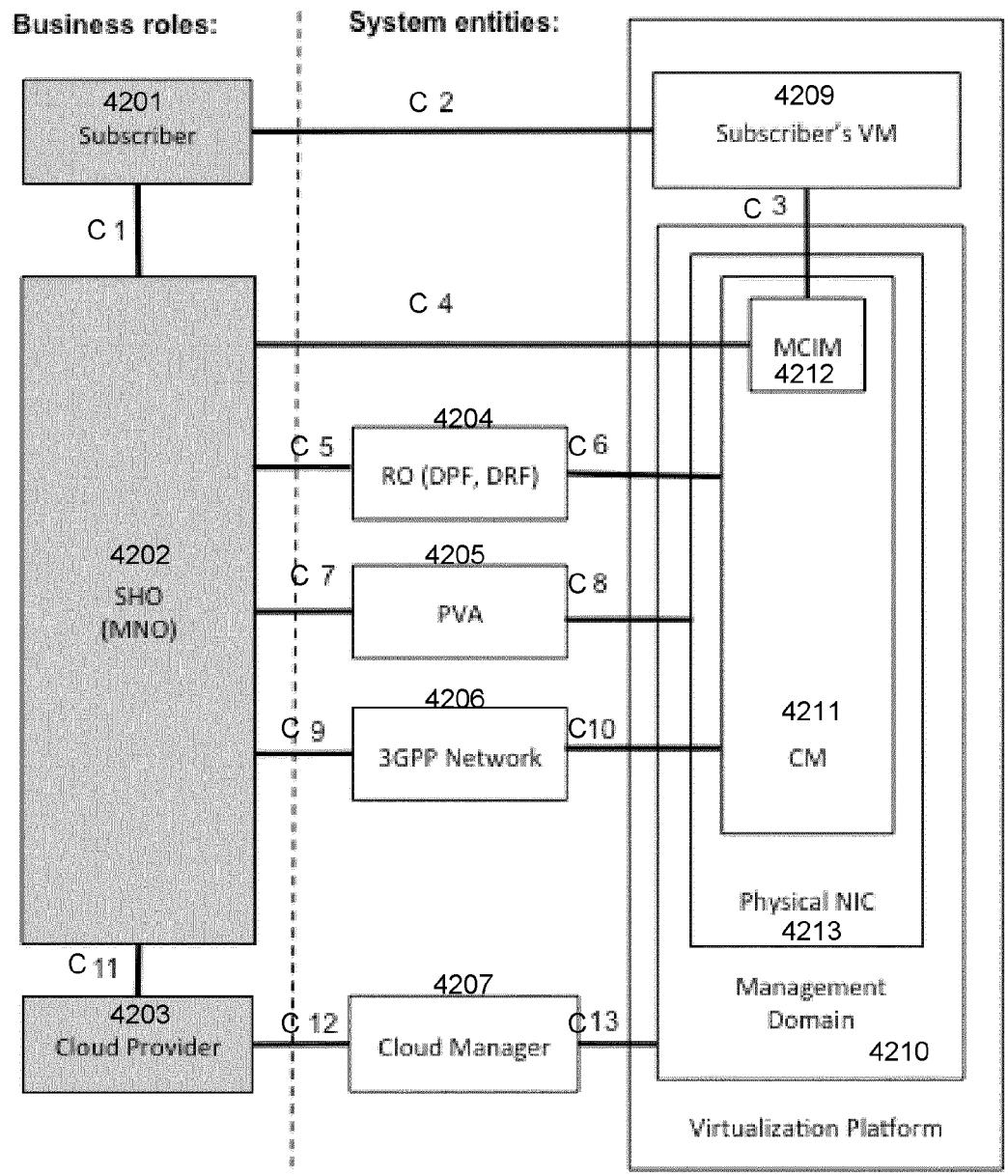
FIG. 42 is a block diagram illustrating the arrangement and communication paths between the entities for the fourth embodiment.

FIG. 42 is a block diagram showing how the various entities described in this fourth embodiment are connected or inter-related. While the system entities are different, the connections numbered C1 to C13 are the same as shown in FIGS. 15, 28 and 35 for the first second and third embodiments.

On the left-hand side of FIG. 42 are shown the business roles or parties involved, including the subscriber 4201 who wishes to become the owner of a VM, the Selected Home Operator (SHO) 4202, who in this embodiment is also the Mobile Network Operator (MNO) of the 3GPP network, and the Cloud Provider 4203. On the right-hand side are shown the system entities. These include: a Registration Operator (RO) 4204 that takes care of the registration and provisioning functions, including the Discovery and Registration Function (DRF) and Download and Provisioning Function (DPF); a Platform Validation Authority (PVA) 4205 that provides the attestation services for the TRE; a 3GPP network 4206; a cloud manager 4207; and a virtualization platform 4208. The virtualization platform 4208 includes the subscriber's VM (or VMs—i.e. the vM2ME) 4209 and the management domain 4210, which in this case extends to include the physical NIC 4213 on which are installed the CM 4211 and MCIM 4212 associated with the Subscriber's VM 4209.

This fourth embodiment provides that the subscriber's MCIM is integrated with a 3GPP communication stack running in a physical NIC. The embodiment allows for highly secure and isolated 3GPP network connection for the subscriber's VM. Due to recent advances in virtualization hardware techniques this embodiment allows servicing of multiple 3G subscriptions on a single NIC.

A particular advantage with this fourth embodiment is that it allows more trustworthy (i.e. secure) cloud deployment strategies than the first embodiment. The deployment of the CM and MCIM in the hardware (pNIC) prevents parties running their VMs on the same physical machine from compromising the credentials of others. Even access for the purpose of controlling the management domain (Dom0) would only allow monitoring of VMs, but could not be used to obtain information from the MCIM.

Another advantage, in terms of performance, is that this embodiment acts as if there was a physical 3G modem assigned to each VM, whereas in the other embodiments the 3G traffic is routed through the management domain (dom0), incurring performance penalties for all virtual machines. Also, because dedicated hardware is employed, even if the virtualization host becomes overloaded, the MCIM operations and 3G connectivity of particular VM can still be guaranteed. Another advantage from the cloud provider's perspective, is that due to the increased level of security new deployment scenarios become attractive (for example, a multi-company setup).

The above-described embodiments enable MNOs to take advantage of the 3GPP architecture and standards to utilize the QoS and charging functions of the 3GPP networks. Also, they provide the MNOs with a new clear business/service role (SmartPipe providers rather than just BitPipe providers). The presented embodiments have the potential to increase the number of subscriptions in the mobile network, wherein each VM gets its own subscriptions, potentially many subscriptions per VM.

The invention claimed is:

1. A method of establishing communications with a Virtual Machine (VM) in a virtualized computing environment using a 3GPP communications network, the method comprising:
  establishing a Machine-to-Machine Equipment Platform (M2MEP) that comprises a Communications Module (CM) providing an end-point of a communication channel between the 3GPP network and the VM; and
  establishing a virtual Machine-to-Machine Equipment that comprises a VM running on the M2MEP and a Machine Communication Identity Module (MCIM) associated with the CM, the MCIM including security data and functions for enabling access via the 3GPP network;
  wherein the CM utilizes data in the MCIM for controlling communication over the communication channel between the VM and the 3GPP network.

2. The method of claim 1, wherein the MCIM is either obtained from a physical Universal Integrated Circuit Card (UICC), Subscriber Identification Module (SIM), or is obtained from a downloadable Universal SIM.

3. The method of claim 1, wherein establishing the Machine-to-Machine Equipment Platform comprises:
  establishing a Trusted Environment (TRE) that comprises computing hardware on which a Virtual Machine Manager (VMM) executes, the VMM including a virtual network interface with the VM.

4. The method of claim 3 wherein the TRE further comprises a Trusted Platform Module (TPM) with a secure boot-loader that executes a secure boot process of the VMM and of a cloud operating system executing in a virtual management domain.

5. The method of claim 4, wherein the TRE further comprises the virtual management domain, and wherein the CM and the MCIM are executed in the virtual management domain.

6. The method of claim 5 wherein the VM is a subscriber VM, and the CM and the MCIM are executed in a virtual network interface of the VMM associated with the subscriber VM.

7. The method of claim 3, wherein the VM is a subscriber VM, the TRE further comprises a network operator VM, and the CM and MCIM are executed in the network operator VM.

8. The method of any of claim 1, wherein the VM is a network operator VM associated with a network operator and providing a platform for applications of a subscriber, and wherein the CM and MCIM are executed in the network operator VM.

9. The method of claim 3, wherein the TRE further comprises a physical Network Interface Card (pNIC), the CM and MCIM being stored and executed in the pNIC, wherein establishing the M2MEP further comprises establishing a PCI Configuration Manager (PCIM) in a virtual management domain, and wherein the CM establishes an IPSec tunnel or a GTP tunnel for communications towards the 3GPP network.

10. The method of claim 8, wherein the pNIC is, or is programmable as, a Peripheral Component Interconnect Express (PCIe), Single Root I/O Virtualization and Sharing (SR-IOV), or Multi Root I/O Virtualization and Sharing (MR-IOV), capable interface card.

11. The method of claim 10, wherein the pNIC has a plurality of execution environments, each execution environment comprising a CM and an associated MCIM relating to a corresponding VM, the method further comprising internally separating within the pNIC network data traffic that flows between the 3GPP network and each of the VMs.

12. The method of claim 10, wherein the pNIC has a primary execution environment comprising a CM and an associated primary MCIM, wherein establishing the VM2ME comprises creating a secure channel over which secondary MCIMs are downloaded, and establishing a plurality of secondary execution environments each comprising a CM and an associated secondary MCIM relating to a corresponding VM.

13. A network entity configured to establish a virtual Machine-to-Machine Equipment (vM2ME) that includes a Virtual Machine (VM) running in a virtualized computing environment wherein communications to/from the VM are via a 3GPP communications network, the network entity comprising a processor and memory storing programming instructions that, when executed by the processor:
   establish a Machine-to-Machine Equipment Platform (M2MEP) that comprises a Communications Module (CM) providing an end-point of a communication channel for communications between the 3GPP network and the VM and for controlling communications between the VM and the 3GPP network; and
   establish the vM2ME that comprises a VM running on the M2MEP and a Machine Communication Identity Module (MCIM) associated with the CM, the MCIM including security data and functions for enabling access via the 3GPP network.

14. The network entity of claim 13, wherein the M2MEP further comprises:
   a Trusted Environment (TRE) that comprises computing hardware on which a virtual machine manager (VMM) executes, the VMM including a virtual interface with the VM.

15. The network entity of claim 14, wherein the Trusted Environment comprises a Trusted Platform Module (TPM).

16. The network entity of claim 13, wherein the M2MEP comprises a Management Domain of the cloud computing environment, and wherein the CM and MCIM are established for execution in the Management Domain.

17. The network entity of claim 13, wherein the M2MEP comprises a virtual machine manager (VMM) with a virtual interface associated with the VM, and wherein the CM and MCIM are established for execution in the virtual interface.

18. The network entity of claim 13, wherein the M2MEP comprises a network operator VM associated with a network operator, and the CM and MCIM are established for execution in the network operator VM.

19. The network entity of claim 18, wherein a subscriber VM for a subscriber is installed for execution on the M2MEP, the CM controlling communications between the subscriber VM and the 3GPP network.

20. The network entity of claim 18, wherein the network operator VM is a platform providing VM services for subscribers.

21. The network entity of claim 13, wherein the Virtualization Platform comprises a physical Network Interface Card (pNIC), the CM and MCIM being stored and executed in the pNIC.

22. The network entity of claim 21, wherein the pNIC is, or is programmable as, a Peripheral Component Interconnect Express (PCIe), Single Root I/O Virtualization and Sharing (SR-IOV), capable interface card.

23. The network entity of claim 21, wherein the Virtualization Platform further comprises a PCI Configuration Manager (PCIM) established for execution in a virtual management domain, and wherein the CM is configured to establish an IPSec tunnel or a GTP tunnel for communications towards the 3GPP network.

24. The network entity of claim 21, wherein the pNIC has a plurality of execution environments, each execution environment comprising a CM and an associated MCIM relating to a corresponding VM, and wherein the pNIC comprises an internal router for separating network data traffic that flows between the 3GPP/LTE network and each of the VMs.

25. The network entity of claim 16 wherein the pNIC has a primary execution environment comprising a CM and an associated primary MCIM, a secure channel over which secondary MCIMs are downloaded, and a plurality of secondary execution environments each comprising a CM and an associated secondary MCIM relating to a corresponding VM.

26. The network entity of claim 25 wherein the primary MCIM is a pre-provisioned MCIM provided by the operator of the 3GPP network.

27. A non-transitory computer-readable medium storing a computer program for configuring a computer node in a network to establish a virtual Machine-to-Machine Equipment that includes a Virtual Machine (VM) running in a virtualized computing environment wherein communications to/from the VM are via a 3GPP communications network, the computer program comprising instructions to cause the node to:
   establish a Machine-to-Machine Equipment Platform (M2MEP) that comprises a Communications Module (CM) providing an end-point of a channel for communications between the 3GPP network and the VM and for controlling communications between the VM and the 3GPP network; and
   establish a virtual Machine-to-Machine Equipment that comprises a VM running on the M2MEP and a Machine Communication Identity Module (MCIM) associated with the CM, the MCIM including security data and functions for enabling access via the 3GPP network.

* * * * *